United States Patent
Noridomi et al.

(10) Patent No.: US 6,587,506 B1
(45) Date of Patent: Jul. 1, 2003

(54) VIDEO EDITING APPARATUS, VIDEO EDITING METHOD, AND DATA STORAGE MEDIUM FOR A VIDEO EDITING PROGRAM

(75) Inventors: Kenichi Noridomi, Fukuoka (JP); Koji Arimura, Fukuoka (JP); Jun Ikeda, Fukuoka (JP); Yuichi Kawaguchi, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 434 days.

(21) Appl. No.: 09/702,806

(22) Filed: Nov. 1, 2000

(30) Foreign Application Priority Data

Nov. 2, 1999 (JP) .............................. 11-312114

(51) Int. Cl.$^7$ .............................. H04B 1/66; H04N 7/50
(52) U.S. Cl. .............. 375/240.12; 348/705; 375/240.26; 386/52; 386/112
(58) Field of Search .................. 375/240.12, 240.26; 386/52, 112; 348/700, 705; H04N 7/50

(56) References Cited

U.S. PATENT DOCUMENTS

| | | | |
|---|---|---|---|
| 5,602,592 A | * | 2/1997 | Mori et al. ............ 375/240.12 |
| 6,049,569 A | * | 4/2000 | Radha et al. .......... 375/240.12 |
| 6,370,199 B1 | * | 4/2002 | Bock et al. ........... 375/240.28 |
| 6,414,999 B1 | * | 7/2002 | Igi et al. ............. 375/240.12 |

FOREIGN PATENT DOCUMENTS

| | | |
|---|---|---|
| JP | 8-65632 | 3/1996 |
| JP | 8-149408 | 6/1996 |
| JP | 10-13783 | 1/1998 |
| JP | 10-32826 | 2/1998 |
| JP | 10-164592 | 6/1998 |
| JP | 10-285529 | 10/1998 |

OTHER PUBLICATIONS

Jianhao Meng and Shih–Fu Chang, "Buffer Control Techniques for Compressed–Domain Video Editing", IEEE Int Symp Circuits Syst., 1996, vol. 2., pp. 600–603.

* cited by examiner

Primary Examiner—Howard Britton
(74) Attorney, Agent, or Firm—Wenderoth, Lind & Ponack, L.L.P.

(57) ABSTRACT

Picture quality loss is minimized and buffer underflow and overflow are prevented when extracting and recombining a plurality of consecutive scenes from an MPEG stream. The smallest number of pictures (equivalent at most to 1 second) that must be re-encoded so that the scene can be independently reproduced is detected to identify the re-encoding target picture. Then the picture type (I, P, B) after the pictures are re-encoded is determined. Buffer fullness is calculated, and the code allocation to the re-encoding range is calculated from buffer fullness and target picture count. The code allocation to each target picture is then calculated, and the target pictures are re-encoded and connected.

18 Claims, 21 Drawing Sheets

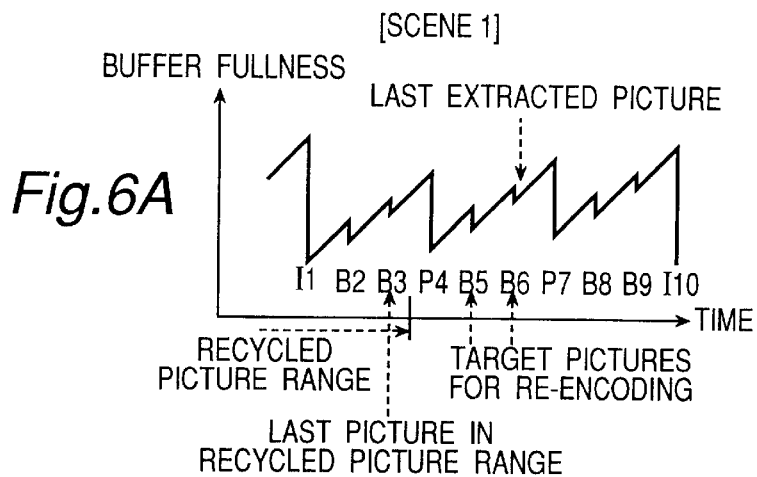
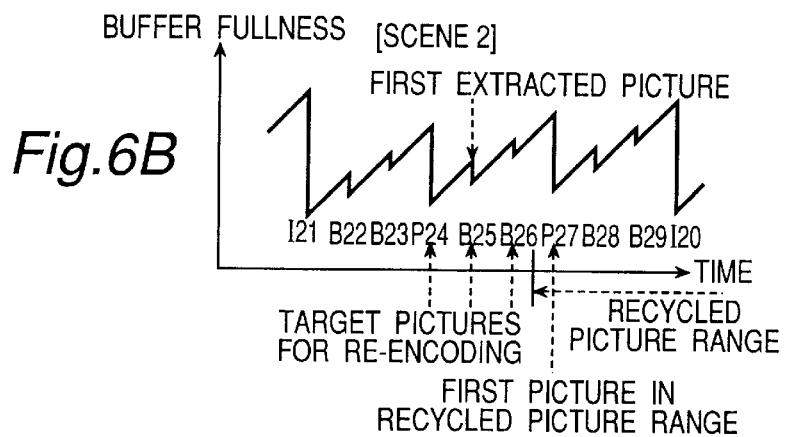
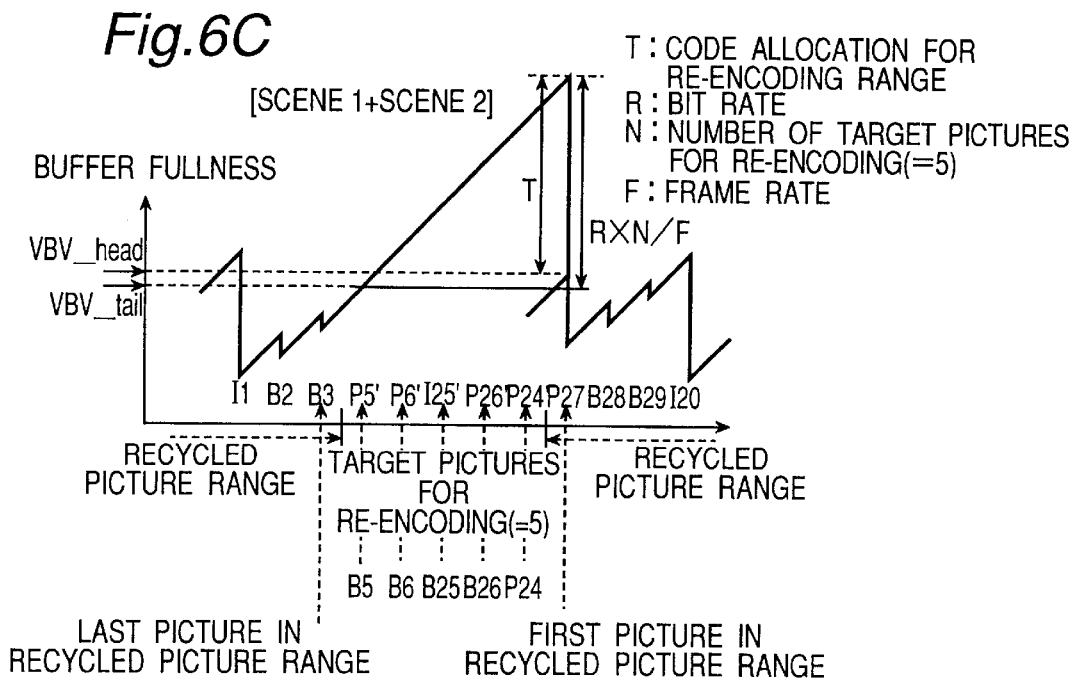

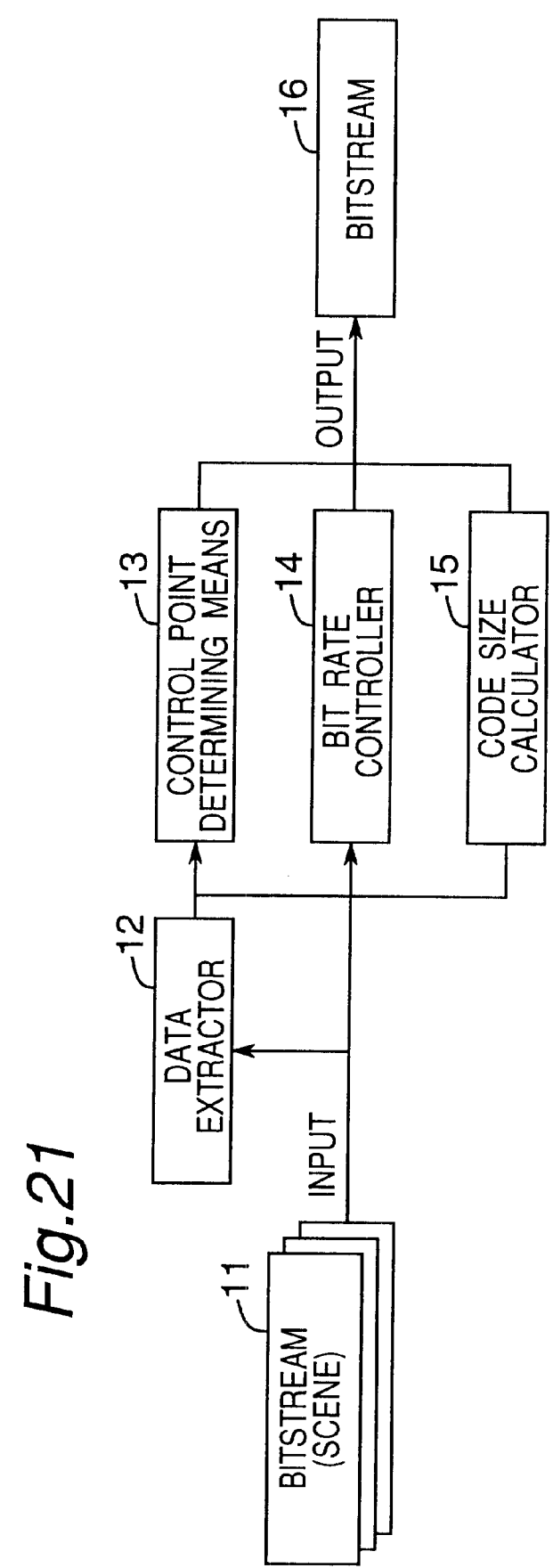

VIDEO EDITING APPARATUS, VIDEO EDITING METHOD, AND DATA STORAGE MEDIUM FOR A VIDEO EDITING PROGRAM

BACKGROUND OF THE INVENTION

1. Field of the Invention

The present invention relates to a video editing apparatus, a video editing method, and a medium for storing a video editing program, and relates more particularly to technology for extracting a plurality of contiguous frames (scenes) from a bitstream encoded according to a Motion Picture Expert Group (MPEG) standard, and producing a new bitstream by combining a plurality of the extracted scenes.

2. Description of Related Art

MPEG is a family of international standards for encoding moving pictures (hereafter referred to as simply "video"). It includes MPEG-1, which is used for video CD and PC video data, for example, and MPEG-2, which is used with DVD and digital broadcast satellite. Other applications for the MPEG standards continue to be found.

More specifically, MPEG has been adopted by the International Standards Organization (ISO) as a standard for a video coding method defining bitstream interpretation and decoding techniques. The MPEG-1 standard has been adopted as ISO-11172, and MPEG-2 as ISO-13818.

MPEG-1 defines a compression technique for compressing and storing video to a digital storage medium with a 1.5 Mbps transfer rate.

MPEG-2 extends MPEG-1, and defines a compression technique more specifically considering applications with communications and broadcast media, in addition to storage media.

Under MPEG-1, video data consists of a sequence of picture frames, enabling the pictures to be compressed using correlations within each frame (intra-frame coding) and correlations between frames (inter-frame coding). Combining these coding techniques yields three picture types based on the compression technique(s) used: I-pictures, or intra-coded pictures; P-pictures, or predictive-coded pictures based only on temporally preceding pictures; and B-pictures, or bidirectionally predictive-coded pictures.

I-pictures are coded based solely on the data within that picture frame, and thus have no correlation to any other frame. P-pictures are coded with reference (correlation) to a temporally preceding (past) frame. B-pictures are coded with correlation to temporally preceding (past) and/or following (future) frames.

FIG. 13 shows the correlation between pictures in an MPEG-1 bitstream. Each square in FIG. 13 represents one picture (frame).

Each frame is labelled with the picture type and ordinal sequence. I indicates an I-picture, P a P-picture, and B a B-picture. Note that this same designation is used throughout the figures and this specification to indicate the picture type.

The frames are further shown in display order from left to right, and the arrows in FIG. 13 indicate the correlation between frames. For example, from FIG. 13 we know that frame B3 is coded with reference to frames I1 and P4.

Because a specific frame can thus be coded with reference to a temporally following (future) frame, the sequence in which frames are presented (the display order, shown on the top row in FIG. 14) to the viewer and the sequence in which frames are stored on the data storage medium (the coding order or data cumulation order in buffer, shown on the bottom row in FIG. 14) are different in an MPEG-1 bitstream containing B-pictures.

Generally speaking, the compression efficiency of these picture types is:

I-pictures<P-pictures<B-pictures and the code size is conversely

I-pictures>P-pictures>B-pictures.

The MPEG-2 scheme can be applied to picture data having a frame structure or a field structure. Video scanning methods include, broadly, non-interlaced scanning and interlaced scanning.

In non-interlaced scanning all pixels in one frame are sampled at the same time. In this case the video is a collection of frames, and thus has a frame structure.

With interlaced scanning every other line in one picture frame is sampled at the same time. The first set of lines sampled at a first time is referred to as the first field, and the second set of lines sampled at a second time is referred to as the second field. Each frame in interlaced scan video thus consists of two fields, and the video has a field structure.

The picture structure in MPEG-2 video having a frame structure is the same as in MPEG-1. However, picture correlations in field structure video are more complicated. Picture correlations in field structure video are shown in FIG. 15.

In FIG. 15 each square represents one field, and the fields are arranged in display order. As will be known from FIG. 15, a P-field can be referenced to the most recently decoded I-field, an I-field and a P-field, or to two P-fields.

However, if the P-field is coded using an I-field as the first field and a P-field as the second field, the P-field can only use the I-field, which is the first field, for prediction. For example, field P2 is coded only with reference to field I1.

A B-field is coded using the two most recently decoded temporally preceding and following I- and P-fields, that is, two temporally preceding and two temporally following fields. For example, field B3 uses preceding fields I1 and P2, and following fields P5 and P6.

The display order and coding order of field structure video is shown in FIG. 16 on the top and bottom rows, respectively.

Two particular tasks to be solved with the related art of the present invention are described next.

First Task to be Solved

When an MPEG video stream compressed using both intra and inter coding is edited by extracting a plurality of consecutive frames (scenes) from the bitstream and then combining a selected subset of the extracted scenes to produce a new frame sequence, the pictures referenced for predictive coding might be lost, resulting in pictures that cannot be reproduced.

The reason for this is explained next with reference to FIG. 17. The arrows in FIG. 17 indicate the correlations between pictures. When specific scenes, that is, pictures B3 to B11, are extracted from this picture sequence, the links to referenced pictures indicated by the Xs are lost. In this example, the correlations between pictures I1 and B3, between I1 and P4, and between I13 and B11, are lost.

While picture B3 is coded with reference to picture I1, picture I1 is not in the extracted sequence from B3 to B11, and picture B3 therefore cannot be reproduced. Pictures P4 and B11 also cannot be reproduced for the same reason.

Second Task to be Solved

FIG. 18(a) shows an idealized decoder, referred to as a system target decoder 2, under the MPEG-1 system, and related peripheral components. Encoded MPEG-1 data is input to buffer 1 at a constant bit rate, and data for one decoded picture is read from buffer 1 at a specific decode timing. Picture data is then output either directly or by way of a reordering buffer 3. Differences in the display order and the coding order are absorbed by the reordering buffer 3.

An MPEG-1 encoder codes video while varying the compression rate to adjust the code size (buffer control) by calculating the buffer capacity needed by the decoder during decoding to prevent both data overflow and data underflow states, that is, the data to be temporarily stored to the decoder buffer exceeds buffer capacity, or the buffer is temporarily depleted because the decoder reads data faster than it is stored to the buffer.

FIG. 18(b) shows the change over time in the amount of data stored temporarily to the buffer (buffer fullness). Where the buffer fullness line drops perpendicularly to the x-axis in FIG. 18(b) (i.e., has a slope of −□) indicates when one picture is read from the buffer 1 by system target decoder 2. The height of the vertical drop in this line is indicative of the code size of one picture. As[] noted above, the code size depends on the picture type where I-picture>P-picture>B-picture.

Data is input to the buffer 1 at a constant rate (slope is a constant positive value) in the periods between when the decoder reads picture data from the buffer.

The buffer 1 of decoder 2 will neither overflow nor underflow when decoding buffer-controlled MPEG-1 data. However, if the video bitstream is edited without considering this, the buffer control provided for during encoding will be disrupted, buffer overflow and underflow states will be possible, and the requirements of the MPEG-1 standard will no longer be satisfied.

The second task of the related art is therefore that buffer overflow or underflow states can occur.

How this is possible is further described with reference to FIG. 19. FIG. 19 shows the change in data stored to buffer 1 when scenes 1 and 2 are extracted from a continuous MPEG-1 stream and simply spliced together. FIG. 19(a) shows the change in data before this editing process, and FIG. 19(b) shows the change after editing. If scenes 1 and 2 are simply spliced together such that storing scene 2 data starts from the end of scene 1, the buffer will overflow as indicated by the X in FIG. 19(b).

Data can be coded using either a variable or a constant bit rate in the MPEG-2 standard. As in the MPEG-1 standard, decoder 2 buffer overflow and underflow states are prohibited when coding with a constant bit rate (CBR).

Furthermore, data coded using a variable bit rate (VBR) will not result in decoder buffer 1 overflow during decoding.

The vbv_delay value written to the picture header of VBR coded video is set to 0xFFFF (note that the C language convention of using the 0x prefix to indicate hexadecimal code is followed in this specification), and data is input to the buffer under the following conditions.

Condition 1: If the buffer is not full, data is input to the buffer at the highest bit rate Rmax.

Condition 2: If the buffer is full, data input to the buffer pauses until a predetermined amount of data is removed from the buffer.

In other words, buffer overflow states are intrinsically avoided, and it is therefore only necessary to consider preventing data underflow states.

FIG. 20 shows the change in buffer fullness with VBR coded data. If the buffer capacity is B in FIG. 20, data is input to the buffer at highest bit rate Rmax as long as buffer fullness is less than or equal to B. Once the buffer becomes full at time t1, data input to the buffer stops until data is removed from the buffer at time t2, i.e., data input stops from time t1 to time t2.

Japanese Patent Laid-open Publication (kokai) 10-164592 proposes technology for resolving the above tasks 1 and 2. Kokai 10-164592 teaches a method for extracting a plurality of frames (scenes) from an MPEG video stream, and connecting a plurality of these scenes to produce a new video stream. The present explanation continues below referring to the technology disclosed in Kokai 10-164592 as prior art.

This conventional technology is described next below with reference to FIG. 21, a block diagram of a video editor according to the related art.

Referring to FIG. 21, data extractor 12 extracts the frame information for each scene from the bitstream 11. Using this frame information, a control point determining means 13 determines the frame (or group of frames) for which the code size is to change, and code size calculator 15 determines the code size (amount of data) to be allocated to the selected frame (or group of frames).

The bit rate controller 14 then codes the data using the code size thus allocated to this frame (or group) and links the data for the scene to generate a new bitstream 16.

More specifically, data extractor 12 sends the frame composition of each scene (that is, the picture types in the scene) to the control point determining means 13. Using this frame composition information sent from data extractor 12, control point determining means 13 determines whether there is a frame at the beginning or end of the scene that must be re-encoded in order to sustain the picture content at the beginning and end of the scene, and defines any such frame as a variable bit rate frame. That is, if a picture referenced to code a particular frame in the display order is not included in the group of frames constituting the scene, that particular frame is designated a variable bit rate frame to be re-encoded with a different code size. If there is a plurality of consecutive variable bit rate frames, these frames are treated as a variable bit rate frame group.

Operation of the code size calculator 15 is described next. The control point determining means 13 sends information about the variable bit rate frame (group) to code size calculator 15. The code size calculator 15 also gets from data extractor 12 such frame information as the bit rate of the bitstream, the buffer size, and the size of the frames in the scene or the frame vbv_delay value.

The original bitstream data is used for all frames other than the selected variable bit rate frame (group), and these frames are referred to as original data frames.

The code size calculator 15 also obtains, from the frame information passed from data extractor 12, the initial buffer fullness, final buffer fullness, and highest and lowest buffer fullness values for the buffer in the original data frame range.

From the initial buffer fullness, final buffer fullness, and highest and lowest buffer fullness values, the code size calculator 15 calculates the range in the newly generated bitstream in which these initial and final buffer fullness values of the original data range are possible. This range is calculated for all scenes.

The code size calculator 15 then determines the code size (target code size) allocated to all variable bit rate frames (group) so that the code size remains within this range.

Operation of the bit rate controller 14 is described next. The bit rate controller 14 re-encodes each of the variable bit rate frames to I-pictures based on the target code size allocated to each variable bit rate frame by code size calculator 15. It is also detected at this time whether coding to an I-picture is possible using the target code size. If not, a number of P-pictures with a difference of 0 is inserted, and the increased code size is added to the target code size of the variable bit rate frame. After thus re-encoding the variable bit rate frames, scene data is relinked to produce a new bitstream.

Problems to be Solved

The related art as described above does not resolve the following problems.

Problem 1

Buffer fullness is analyzed for every picture in a scene in order to calculate the code size of the re-encoded pictures. Depending on the scene length, this may require processing a large amount of data.

Problem 2

It may be necessary to insert some number of zero-difference P-pictures in order to avoid picture degradation, and the frame number may therefore change before and after editing. Frame numbers therefore cannot be indexed during editing, and editing is thus more difficult.

Problem 3

All re-encoded pictures are I-pictures. I-pictures consume a large amount of code. Coding efficiency thus drops.

Problem 4

Code size is evenly allocated to plural re-encoded pictures at the point the scenes are edited. If there are many re-encoded pictures and a small amount of code is allocated, picture degradation propagates and the quality of the entire video sequence drops.

Problem 5

Calculating the occupied buffer capacity around the point where a scene is edited is difficult with VBR coded MPEG data. Buffer control is therefore difficult.

The object of the present invention is therefore to provide technology resolving the first and second tasks described above as well as the above-noted problems 1 to 5.

SUMMARY OF THE INVENTION

To resolve the first and second tasks, and problems 1 and 2 above, a video editor according to the invention has a scene information input means for inputting scene information, where a scene is a plurality of consecutive frames extracted from an edit stream; a re-encoding target picture selector for selecting as target pictures for re-encoding the smallest number of pictures that must be re-encoded for the scene to be independently reproducible; a stream structure data generator for generating structure information for the stream range containing a target picture and an intra-coded picture referenced for coding the target picture; a buffer fullness calculating means for calculating, from stream structure data, buffer fullness, or buffer occupancy, at a target picture boundary to a recycled picture not requiring re-encoding; a re-encoding range code allocation calculator for calculating a code allocation to a re-encoding range based on buffer fullness and target picture count, said re-encoding range being one or a plurality of target pictures near an edit point between scenes; a re-encoding target picture target code size calculating means for calculating a code allocation to each target picture based on the re-encoding range code allocation, target picture count, and picture type after re-encoding; and a scene linking means for connecting scenes and producing a new stream.

To resolve problem 3 above, the video editor of the invention further preferably has a re-encoding target picture type determining means for deciding, from stream structure data, a target picture picture type after re-encoding; and a picture re-encoding means for target picture re-encoding based on target picture target code size and picture type after re-encoding.

To resolve problem 4 above, the video editor of the invention further preferably has a code allocation verifying means for verifying whether the code allocation is appropriate based on the re-encoding range code allocation and target picture picture type after re-encoding; and a re-encoding range expanding means for extending the re-encoding range if the code allocation is not appropriate.

Yet further preferably to resolve problem 4 above, the video editor of the invention preferably has a re-encoding target picture importance calculating means for calculating an importance rating for each target picture in the re-encoding range.

To resolve problem 5 above, the video editor of the invention further preferably has a buffer fullness analyzing means for analyzing buffer fullness change when the edit stream is variable bit rate coded and calculating buffer fullness is difficult.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6(a) is a graph showing the change in buffer fullness at the end of a scene; (b) is a graph showing the change in buffer fullness at the beginning of a scene; and (c) is a graph showing the change in buffer fullness after scenes are linked;

FIG. 21 is a block diagram of a video editing apparatus according to the prior art.

DESCRIPTION OF THE PREFERRED EMBODIMENTS

A video editing apparatus and method according to the present invention combines a scene 1 and a scene 2 to produce a new bitstream as shown in FIGS. 12(a) and (b). Some specific terms used in the following description of the invention are defined as follows.

Scene: a picture sequence containing a plurality of consecutive frames for editing.

Figure 12:
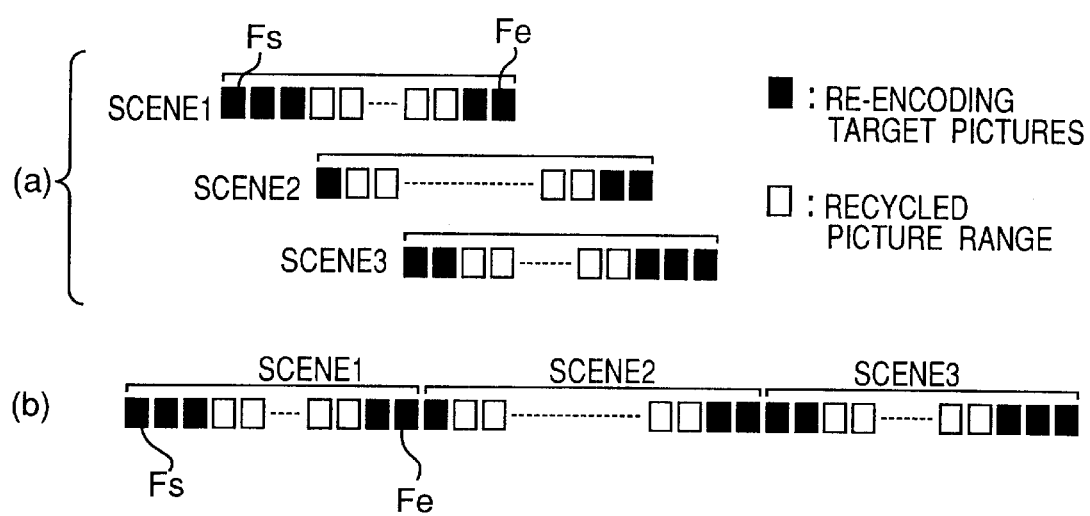
FIG. 12 shows scene linking.
Figure 13:
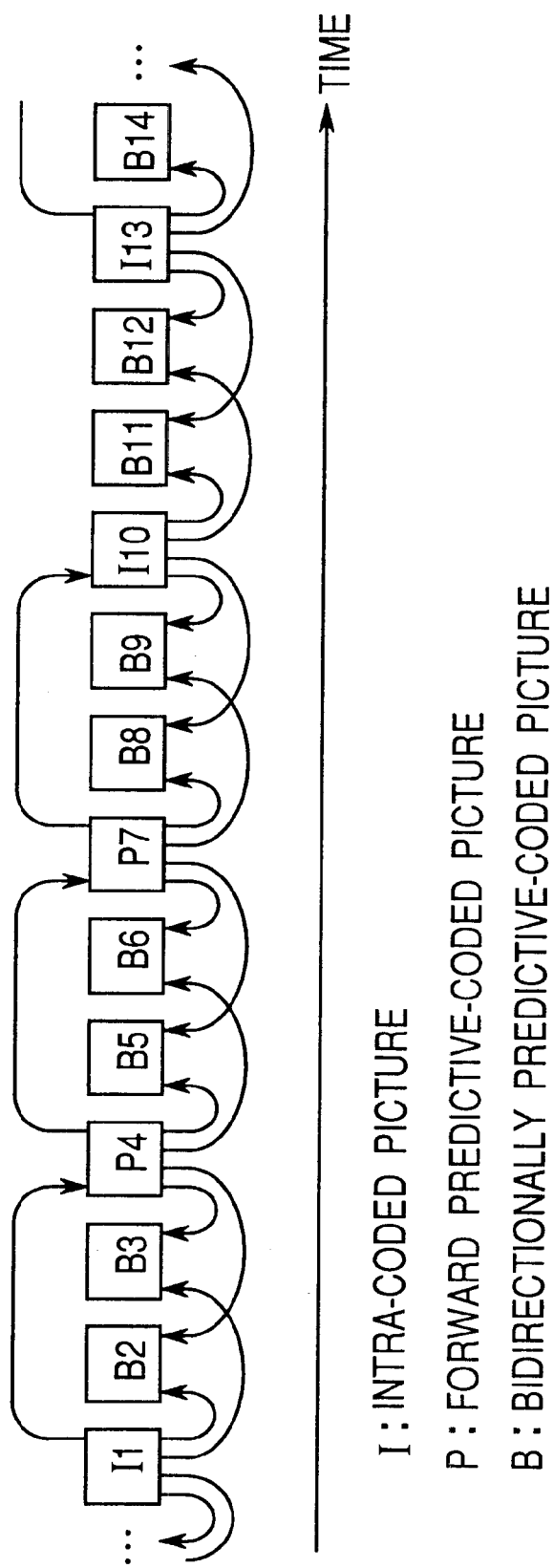
FIG. 13 shows the correlation between pictures in a conventional MPEG-1 stream.
Figure 14:
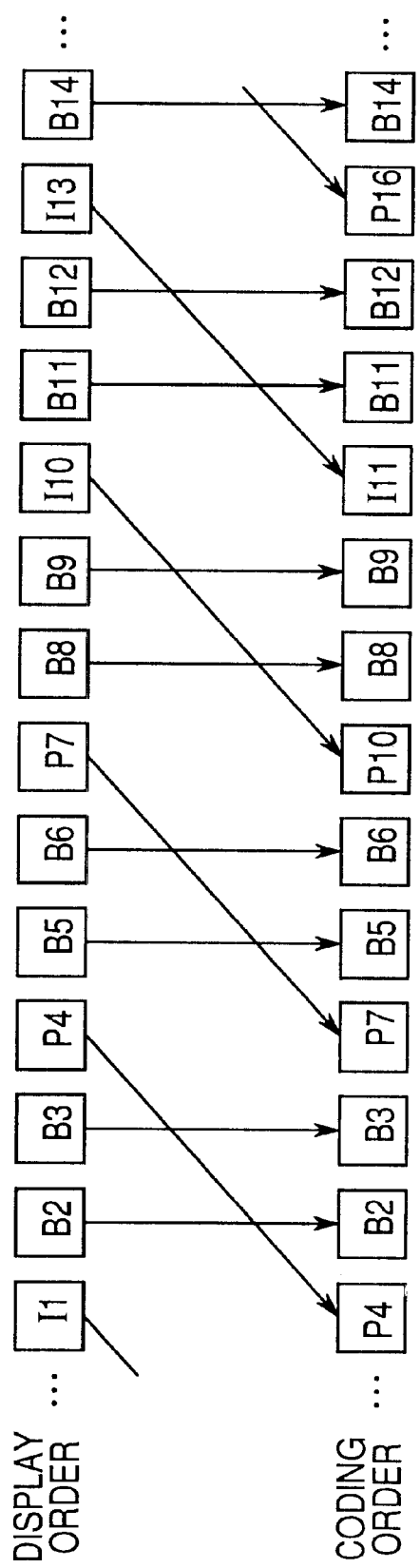
FIG. 14 shows the display order and coding order in a conventional MPEG-1 stream.
Figure 15:
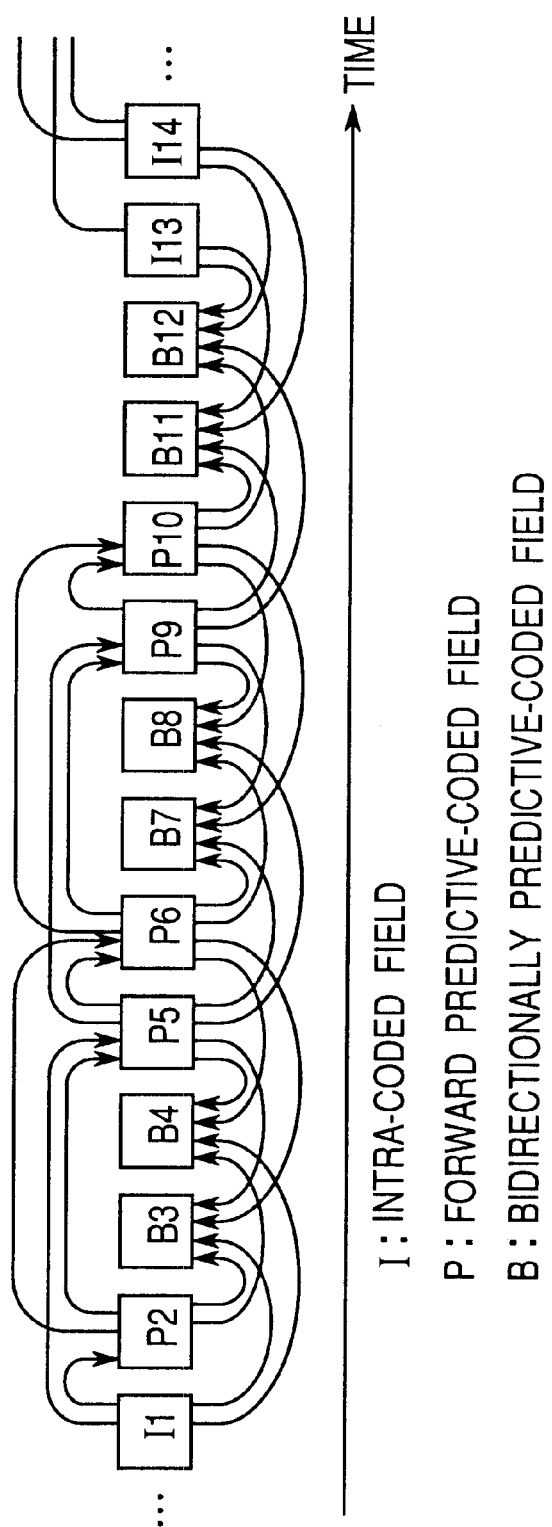
FIG. 15 shows the correlation between pictures in a conventional MPEG-2 stream with a field structure.
Figure 16:
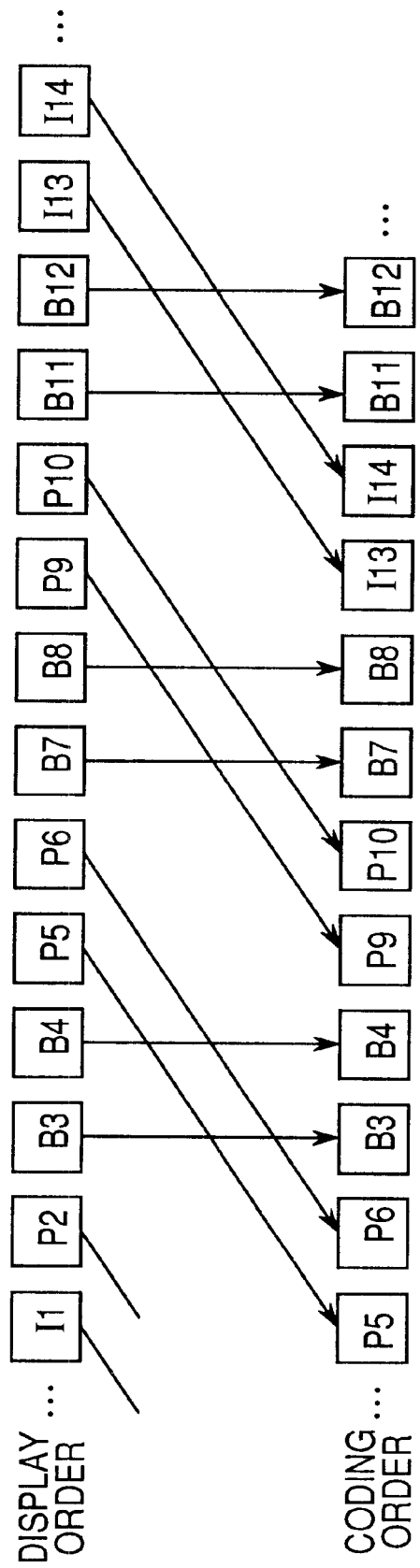
FIG. 16 shows the display order and coding order in a conventional MPEG-2 stream with a field structure.
Figure 17:
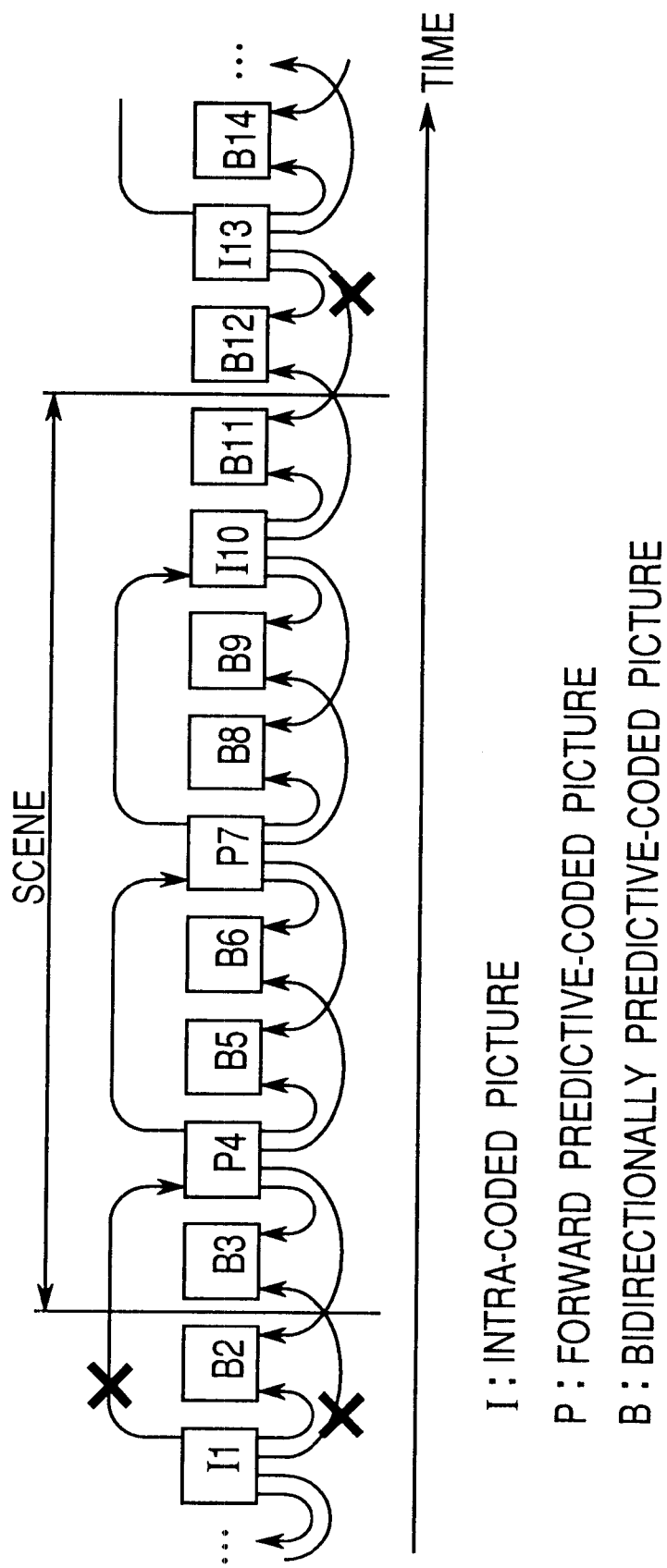
FIG. 17 is used to describe why pictures that cannot be reproduced occur with scene extraction according to the prior art.
Figure 18A:
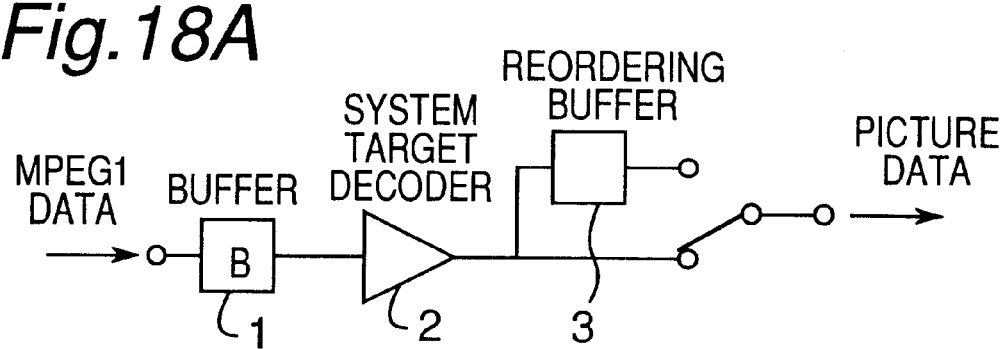
FIG. 18(a) is a block diagram of a conventional MPEG-1 data decoder, and (b) is a graph showing the change in buffer fullness with a conventional editing method.
Figure 18B:
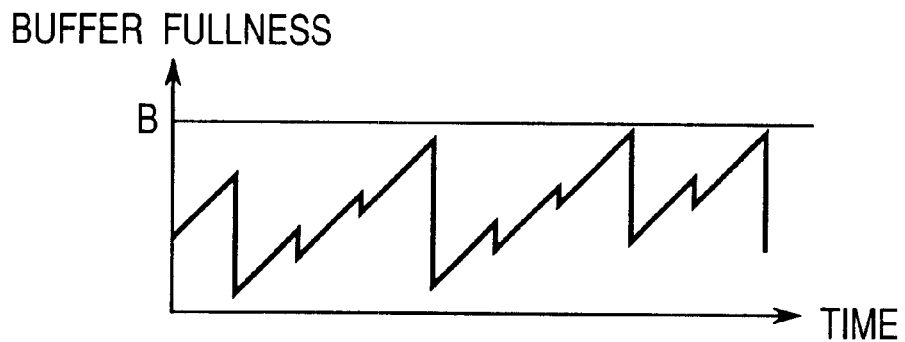
Figure 19A:
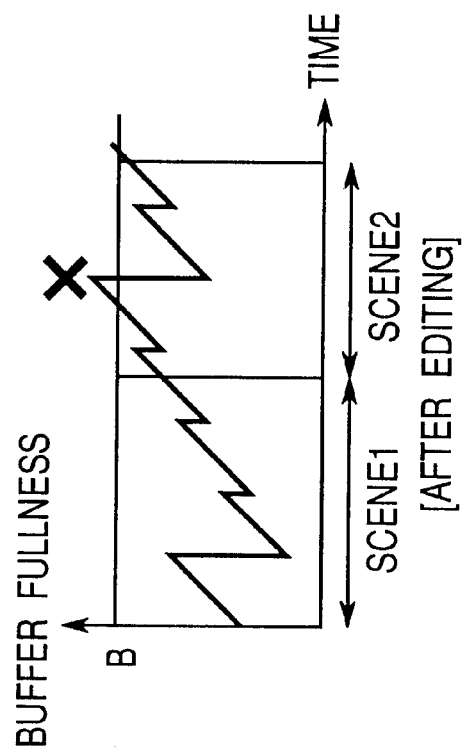
FIG. 19(a) is a graph showing the change in buffer fullness before editing with a conventional method, and (b) is a graph showing the change in buffer fullness after editing with a conventional method.
Figure 19B:
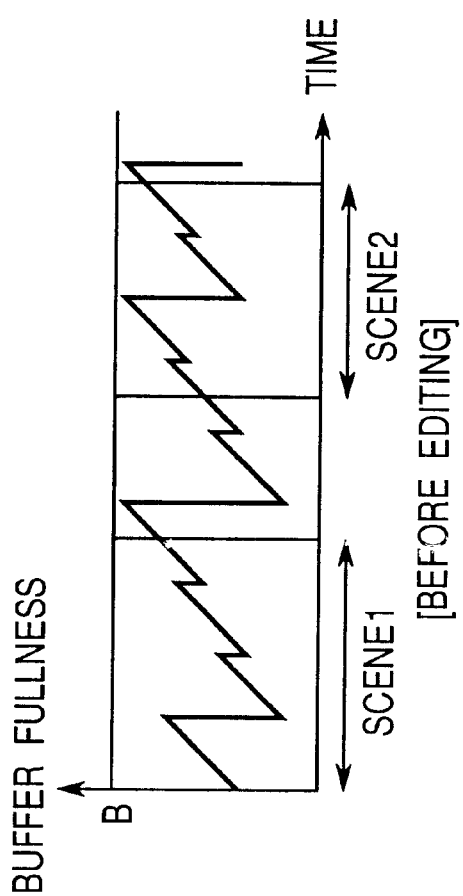
Figure 20:
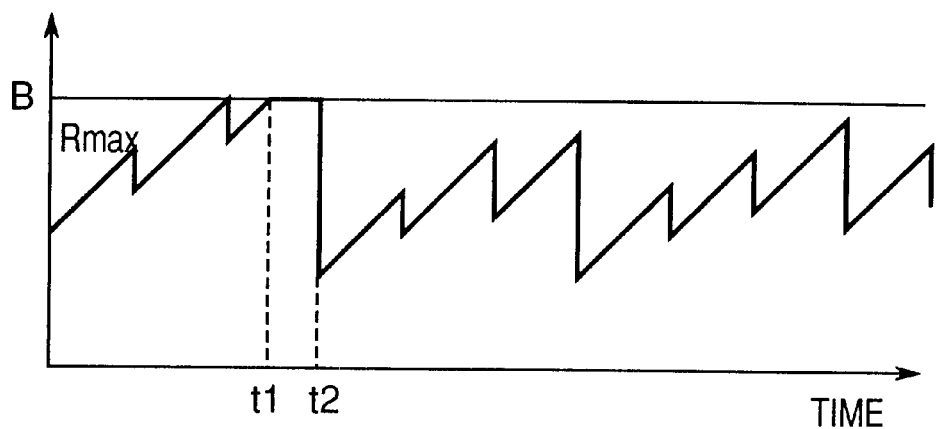
FIG. 20 is a graph showing the conventional change in buffer fullness with VBR coded data.

Extracted first picture: the picture, that is, the frame, located at the beginning of an extracted scene (frame Fs in FIG. 12).

Extracted last picture: the picture, that is, the frame, located at the end of an extracted scene (frame Fe in FIG. 12).

Re-encoded picture: One or a plurality of encoded pictures at the beginning of the extracted scene, or one or a plurality of encoded pictures at the end of the extracted scene, that is decoded and then re-encoded. Also referred to as "target picture." These pictures are indicated by the solid black blocks in FIG. 12.

Recycled picture: Any encoded picture located in the extracted scene between the first target picture and the last target picture that is used in the edited bitstream as encoded in the original bitstream. These pictures are indicated by the white squares in FIG. 12.

Recycled picture range: The range of frames containing the recycled pictures. See FIG. 12.

A preferred embodiment of the present invention is described next below with reference to the accompanying figures.

Depending upon the scene extracted from the bitstream, there will be pictures (such as a B-picture) at or near the beginning of the extracted scene that are encoded with correlation to a picture outside the extracted scene. Such pictures cannot be reproduced using only the picture information contained in the extracted scene, and it is therefore necessary to re-encode either just the first extracted picture or this first picture and some adjacent pictures. The re-encoding process of the present invention is described next below with reference to FIG. 1.

Figure 1:
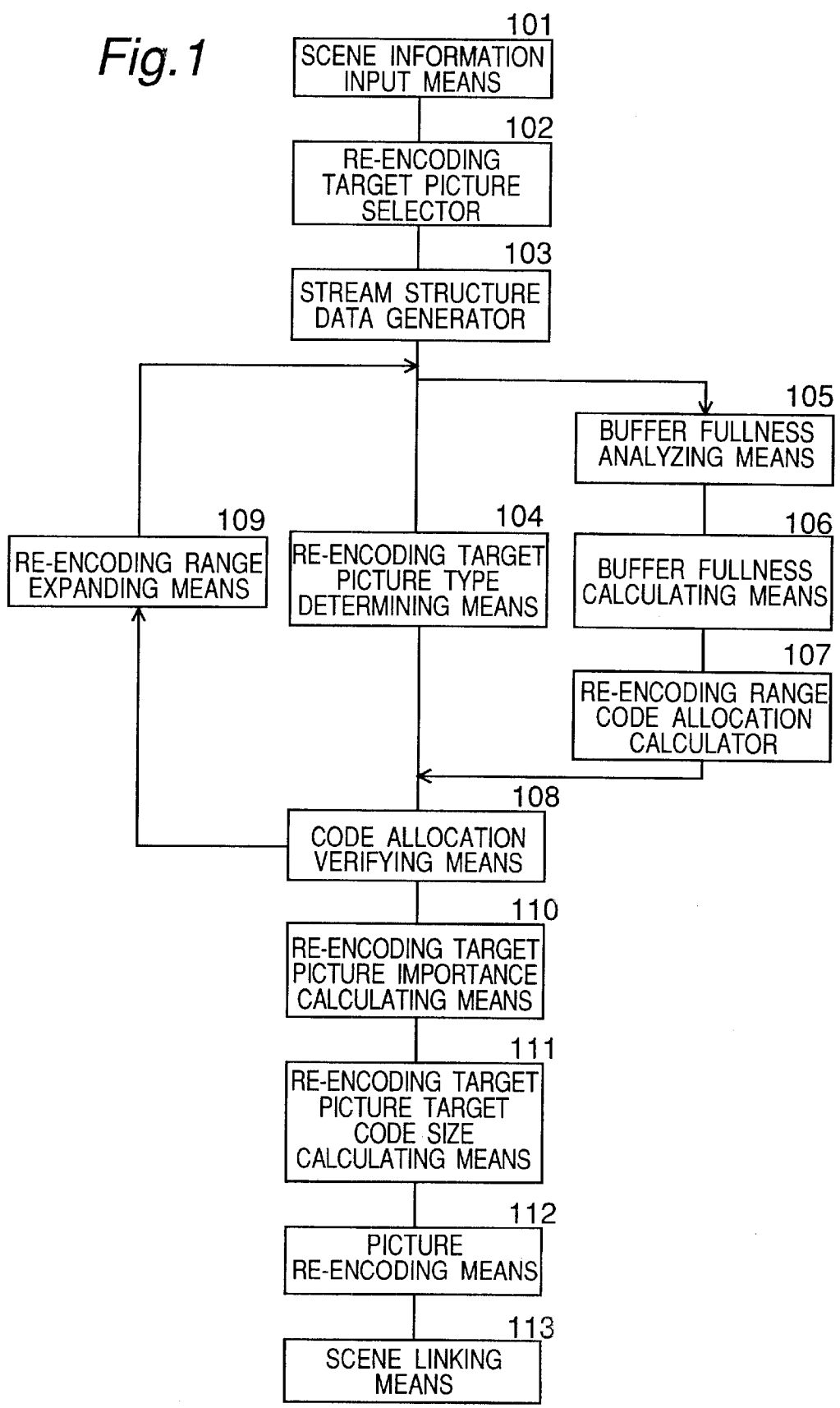
FIG. 1 is a block diagram of a video editing apparatus according to a preferred embodiment of the present invention.

Referring to FIG. 1, scene information input means 101 passes information about the extracted scene, the extracted scene being a plurality of consecutive frames specified by the operator for extraction from the bitstream for editing (referred to below as the edit stream).

The re-encoding target picture selector 102 selects and labels as target pictures the smallest number of pictures that must be re-encoded so that the extracted scene can be independently reproduced, that is, reproduced without reference to any picture not contained within the scene.

The stream structure data generator 103 produces information about the structure of the bitstream in the range containing the target pictures and any intra-coded pictures referenced for coding the target pictures.

Using the stream structure information, the re-encoding target picture type determining means 104 then determines the picture type (I-picture, P-picture, B-picture) of the target picture after it is re-encoded.

The buffer fullness analyzing means 105 analyzes the change in buffer fullness based on the stream structure data when the edit stream is VBR coded and calculating buffer fullness is difficult.

Based on the stream structure data and the buffer fullness analysis, buffer fullness calculating means 106 calculates the buffer fullness at the boundary between target pictures and recycled pictures not needing re-encoding.

Re-encoding range code allocation calculator 107 calculates the amount of code to allocate to the re-encoding range based on the buffer fullness and number of target pictures. The re-encoding range as used herein is a range of pictures bracketing the edit position between scenes, specifically containing one or a plurality of target pictures at the end of the scene temporally preceding the edit position, and one or a plurality of target pictures at the beginning of the scene following the edit position. The re-encoding range code allocation calculator 107 calculates the amount of code to allocate to the re-encoding range based on the buffer fullness and number of target pictures to be re-encoded where the re-encoding range contains one or more target pictures in proximity to the point where the two scenes are joined.

The code allocation verifying means 108 verifies whether code allocation T is appropriate in terms of amount based on the picture type of the target pictures after re-encoding and the code allocation for the re-encoding range.

Re-encoding range expanding means 109 expands the re-encoding range when code allocation T is not appropriate.

Re-encoding target picture importance calculating means 110 determines the importance of each target picture in the re-encoding range.

Re-encoding target picture target code size calculating means 111 calculates the amount of code to allocate to each target picture based on the calculated importance rating of each target picture, the code allocation for the re-encoding range, the number of target pictures, and the picture type after re-encoding. Note that target picture importance is not always needed for this calculation.

Picture re-encoding means 112 re-encodes the target pictures based on the calculated target picture code size and picture type after re-encoding.

Scene linking means 113 then links the scenes and generates a new bitstream.

Figure 2:
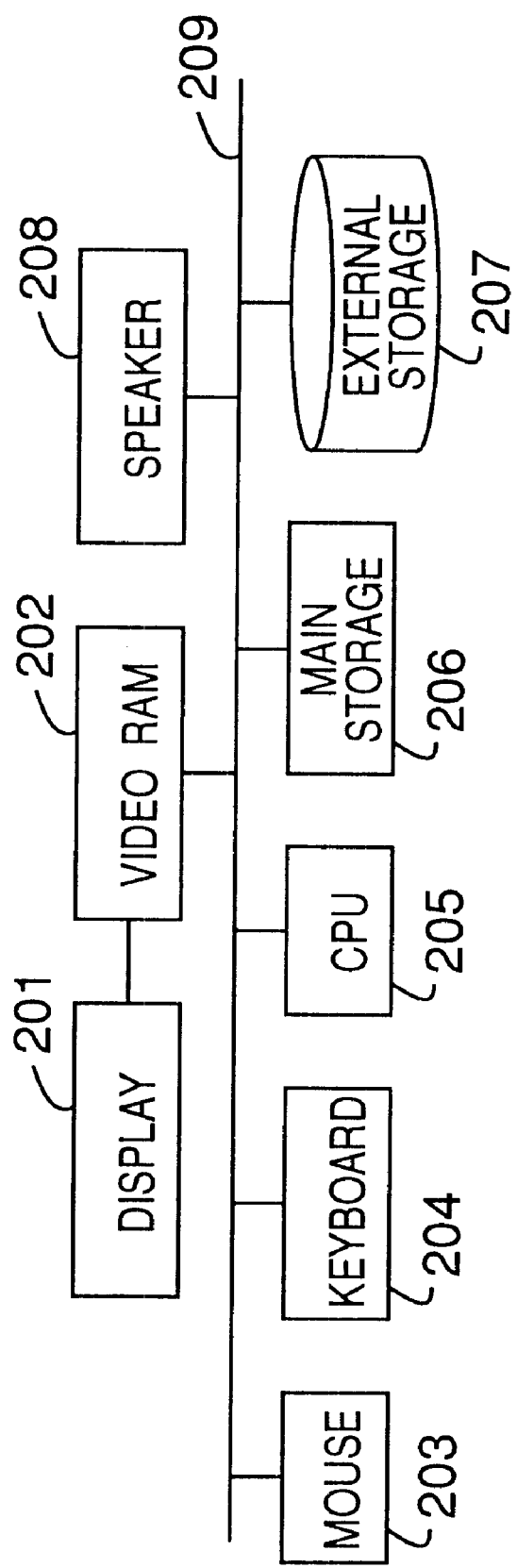
FIG. 2 is a block diagram of the hardware configuration of the apparatus shown in FIG. 1.

FIG. 2 is a block diagram showing the hardware configuration of the same apparatus. CPU 205 controls operation of peripheral devices according to a control program stored, for example, in external storage 207. The peripheral devices, including in FIG. 2 display 201, video RAM 202, mouse 203, keyboard 204, main storage 206, external storage 207, and speaker 208 are interconnected by bus 209.

Video RAM 202 stores the picture data presented on display 201. The keyboard 204 inputs to CPU 205 key codes corresponding to the keys operated by the user. When the mouse button is operated, mouse 203 inputs a code corresponding to the operated button to the CPU 205; when mouse 203 is moved, it inputs a code corresponding to the movement. The various means 101 to 113 shown in FIG. 1 are accomplished by the CPU 205 appropriately controlling these peripheral devices and running the control program.

Figure 3:
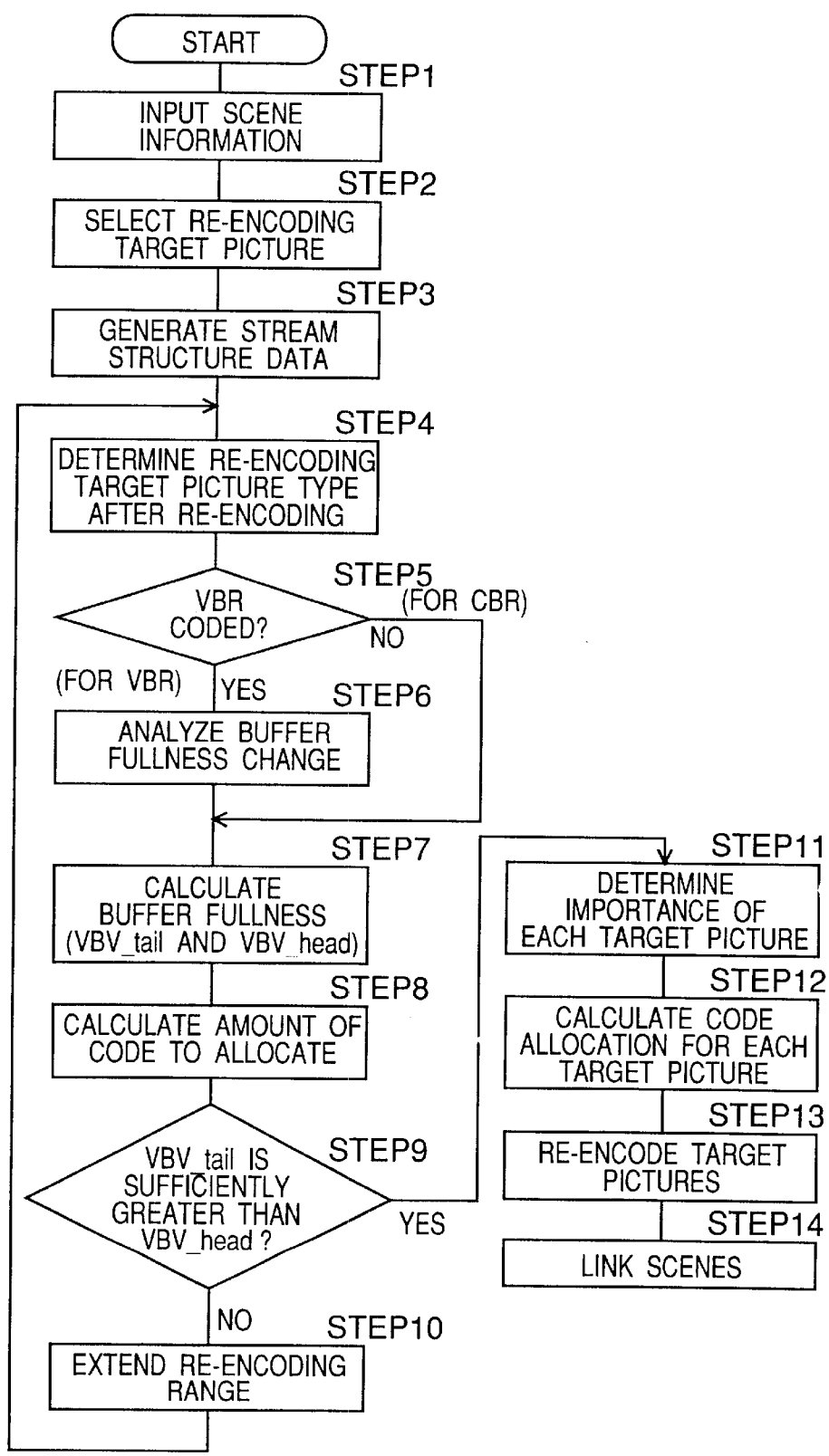
FIG. 3 is a flow chart of the editing process of the apparatus shown in FIG. 1.

FIG. 3 is a flow chart of the general video editing process according to the present invention and described below.

The first step (step 1) is inputting the scene information, which is accomplished by the operator using the scene information input means 101 to select the desired scene, that is, a plurality of consecutive frames to be extracted from the original bitstream for editing. The re-encoding target picture selector 102 then determines the target pictures by detecting the smallest number of target pictures that must be re-encoded in order for the extracted scene to be independently reproducible (step 2).

The stream structure data generator 103 then produces information about the structure of the bitstream in the range containing the target pictures and any intra-coded pictures referenced for coding the target pictures (step 3), and the re-encoding target picture type determining means 104 then determines the picture type of the target picture(s) after they are re-encoded (step 4).

Whether the edit stream is VBR coded is then detected (step 5). If it is, buffer fullness analyzing means 105 analyzes the change in buffer fullness (step 6). If not, the procedure skips to step 7.

The buffer fullness calculating means 106 calculates the buffer fullness at the boundary between target pictures and recycled pictures not needing re-encoding (step 7), and re-encoding range code allocation calculator 107 calculates the amount of code to allocate to the re-encoding range based on the buffer fullness and number of target pictures (step 8).

The code allocation verifying means 108 verifies whether code allocation T is appropriate in terms of amount based on the picture type of the target pictures after re-encoding and the code allocation for the re-encoding range (that is, whether VBV_tail is sufficiently greater than VBV_head as further described below) (step 9). If the code allocation T is not appropriate, the re-encoding range is extended (step 10), and the procedure loops back to step 4.

If it is appropriate, re-encoding target picture importance calculating means 110 determines the importance of each target picture in the re-encoding range (step 11). The re-encoding target picture target code size calculating means 111 then calculates the code allocation for each target picture based on the detected importance of each target picture, the code allocation for the re-encoding range, the number of target pictures, and the picture type after re-encoding (step 12).

The picture re-encoding means 112 then re-encodes the target pictures based on the calculated target picture code size and picture type after re-encoding (step 13), and finally scene linking means 113 links the scenes to produce a new bitstream (step 14).

The operation of these various means is described in further detail below with reference to the flow chart in FIG. 3.

Scene Information Input Means 101

The scene information is input in step 1 by means of scene information input means 101. This scene information identifies the plural consecutive frames to be extracted from the bitstream to be edited.

In this exemplary embodiment of the invention scene information includes the number of scenes to be linked, the sequence in which they are linked, the extracted picture information, and the output file name.

The extracted picture information is the connected content and information identifying the interval containing the content, and includes the content file name, the byte position of the first extracted picture, and the byte position of the last extracted picture. Here, the first extracted picture is the picture that comes at the beginning of the extracted scene, and the last extracted picture is the picture that comes at the end of the extracted scene. The number of extracted picture information entries is the same as the number of extracted pictures.

The output file name is the name of the file to which the new bitstream generated by linking the edited scenes is output in step 14.

Re-encoding Target Picture Selector 102

In step 2 the re-encoding target picture selector 102 determines the target pictures by detecting the smallest number of pictures that must be re-encoded in order for the extracted scene to be independently reproducible. It also identifies the range of frames containing the recycled pictures, that is, the range of pictures that is encoded in the new bitstream using the original data; this is referred to below as the recycled picture range. The identified target pictures are re-encoded in step 13, and the recycled picture range encoded in the new bitstream using the original data.

Target pictures must be identified at the beginning and end of the scene in order for the scene to be independently reproducible. A method for identifying the target pictures in this step is described below for pictures at the beginning of the scene and at the end.

Identifying target pictures at the beginning of the scene is described first below. If the first extracted picture is an I-picture, the target picture is only the first extracted picture, and the first picture in the recycled picture range is the first I-picture or P-picture found by searching forward from the first extracted picture. Note that "forward" as used herein means in the direction of the next picture in the temporal direction as indicated by the arrow in FIG. 4; "reverse" or "back" as used herein means in the direction of the previous picture in the temporal direction as indicated by the arrow in FIG. 5; and searching is accomplished in the coding order.

If the first extracted picture is a P-picture, the target picture is only the first extracted picture, and the first picture in the recycled picture range is the first I-picture or P-picture found by searching forward from the first extracted picture.

If the first extracted picture is a B-picture, the target pictures include the first extracted picture and the first I-picture or P-picture found by searching backward from the first extracted picture, and all pictures between the first extracted picture and the picture immediately temporally before the first I-picture or P-picture found by searching forward from the first extracted picture. The first picture in the recycled picture range is the first I-picture or P-picture found by searching forward from the first extracted picture.

Figure 4:
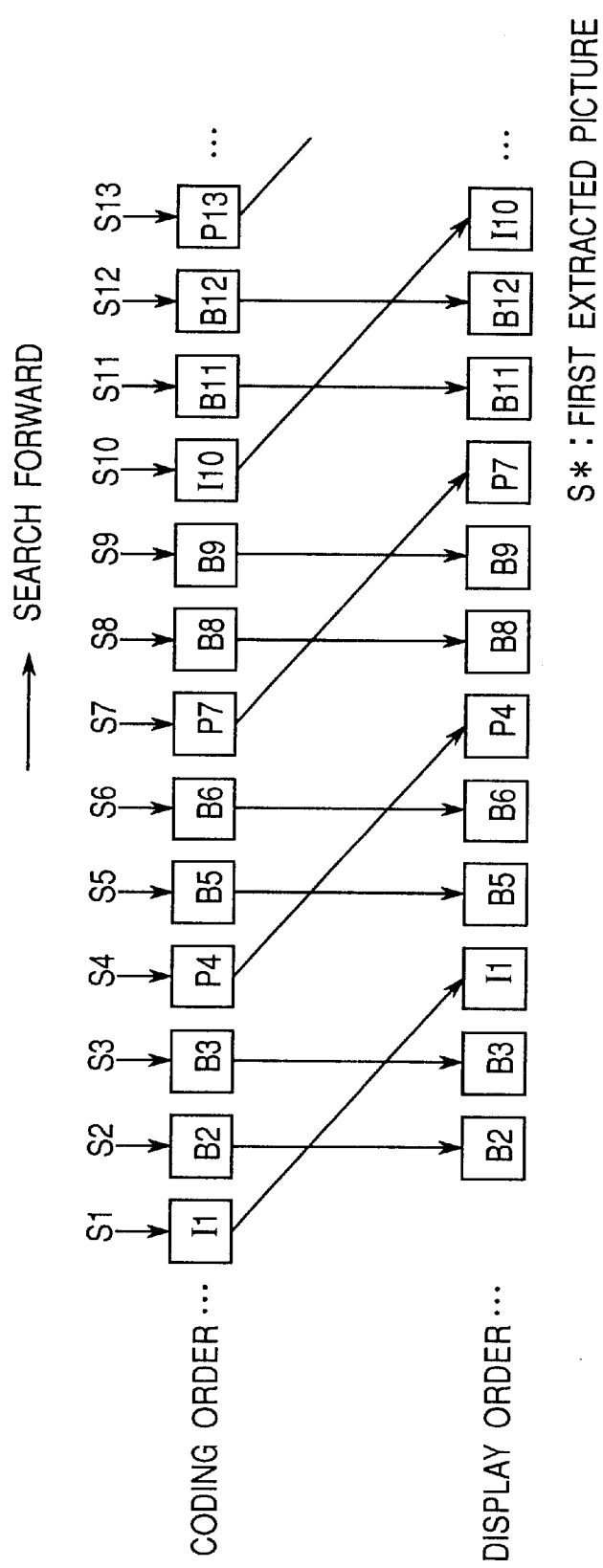
FIG. 4 shows how target pictures are identified at the beginning of a scene.

Selecting the target picture at the beginning of the scene is described more specifically with reference to FIG. 4.

Pictures are shown on the top row in FIG. 4 in the coding order, and on the bottom row in display order. The first extracted pictures in FIG. 4 are indicated by indices S1 to S12. The re-encoding target picture, the picture count, and the first picture in the recycled picture range selected for pictures S1 to S12 are shown in the following table.

TABLE 1

| First extracted picture | No. of re-encoded pictures | Re-encoded pictures | First picture in recycled picture range |
| --- | --- | --- | --- |
| S1 | 1 | I1 | P4 |
| S2 | 3 | I1, B2, B3 | P4 |
| S3 | 2 | I1, B3 | P4 |
| S4 | 1 | P4 | P7 |
| S5 | 3 | P4, B5, B6 | P7 |
| S6 | 2 | P4, B6 | P7 |
| S7 | 1 | P7 | I10 |
| S8 | 3 | P7, B8, B9 | I10 |
| S9 | 2 | P7, B9 | I10 |
| S10 | 1 | I10 | P13 |
| S11 | 3 | I10, B11, B12 | P13 |
| S12 | 2 | I10, B12 | P13 |

As shown in Table 1, if the first extracted picture is picture S5 in FIG. 4, the corresponding target pictures are P4, B5, and B6, and the first picture in the recycled picture range is P7. After editing, pictures P4, B5, and B6 are re-encoded, and picture P7 and later in the coding order are recycled with the original picture data. After re-encoding, picture P4 is re-encoded to an I-picture, for example, and pictures B5 and B6 are dropped because they are before picture P4 in the display order.

Identifying the target pictures at the end of the scene is described next.

If the last extracted picture is an I-picture, there is no target picture, and the last picture in the recycled picture range is the picture immediately temporally preceding the first I-picture or P-picture found by searching forward from the last extracted picture.

If the last extracted picture is a P-picture, there is no target picture, and the last picture in the recycled picture range is the picture immediately temporally preceding the first I-picture or P-picture found by searching forward from the last extracted picture.

If the last extracted picture is a B-picture, the target pictures are the pictures including from the last extracted picture to the picture immediately temporally following (future) the first I-picture or P-picture found by searching backward from the last extracted picture. The last picture in the recycled picture range is the first picture immediately temporally befor (past) the first I-picture or P-picture found by searching backward from the last extracted picture.

Selecting the target pictures at the end of the scene is more specifically described below with reference to FIG. 5.

Figure 5:
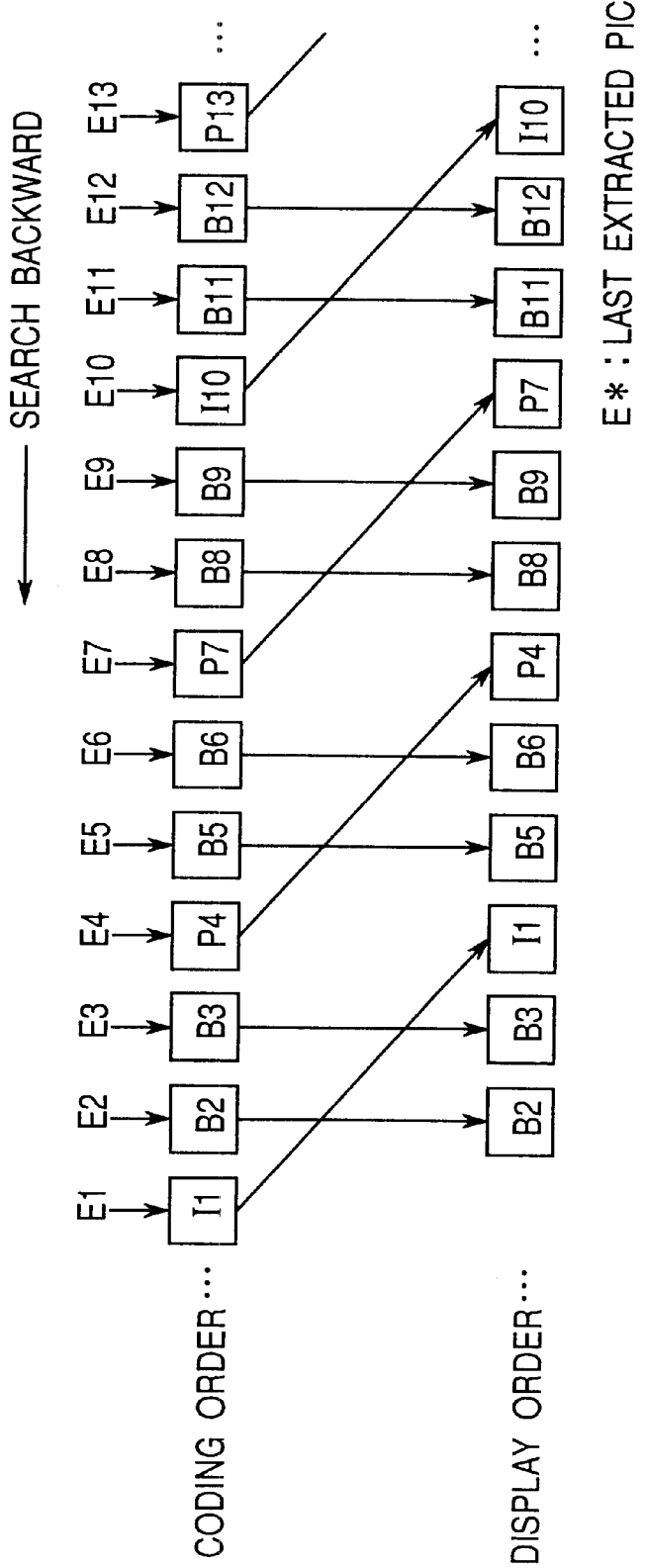
FIG. 5 is a shows how target pictures are identified at the end of a scene.

Pictures are shown on the top row in FIG. 5 in the coding order, and on the bottom row in display order. If the last extracted pictures are indicated by indices E4 to E12 in FIG. 5, the re-encoding target picture, the picture count, and the last picture in the recycled picture range are as shown in the following table.

TABLE 2

| Last extracted picture | No. of re-encoded pictures | Re-encoded picture | Last picture in recycled picture range |
| --- | --- | --- | --- |
| E4 | 0 |  | B6 |
| E5 | 1 | B5 | B3 |
| E6 | 2 | B5, B6 | B3 |
| E7 | 0 |  | B9 |
| E8 | 1 | B8 | B6 |
| E9 | 2 | B8, B9 | B6 |
| E10 | 0 |  | B12 |
| E11 | 1 | B11 | B9 |
| E12 | 2 | B11, B12 | B9 |

As shown in Table 2, the target picture for last extracted picture E5 is B5, and the picture B3 is the end of the recycled picture range. After editing, picture B5 is re-encoded to an I-picture or P-picture, and picture P4 is dropped because it temporally follows picture B5. Pictures B3 and before in the coding order are within the recycled picture range and are therefore simply recycled using the original picture data.

The basic method for target picture selection is described above. Target pictures for re-encoding are thus identified for each scene at the beginning of the scene and at the end of the scene. The recycled picture range in each scene further extends from the first picture in the recycled picture range to the last picture in the recycled picture range. By thus re-encoding only the specifically selected target pictures, each scene can be reproduced independently of any pictures not contained in the scene frame sequence. Re-encoding is thus limited to the smallest number of pictures possible, and processing can therefore be efficiently accomplished.

Stream Structure Data Generator 103

Next, in step 3, stream structure data generator 103 produces information about the structure of the bitstream in the range containing the target pictures and any intra-coded pictures referenced for coding the target pictures.

This stream structure information includes the byte location of each picture, and the header information added to each picture, and includes the correlated I-picture required for re-encoding the target pictures.

In this preferred embodiment of the invention the stream structure data is a list structure linking in the coding order a range of pictures having a presentation time of at least one-second. This range of pictures includes the first I-picture at the end of the extracted scene found by searching backward in the original picture data bitstream from the target picture near the end of the extracted scene, the first I-picture outside the extracted scene found by searching forward from the target picture in the original picture data bitstream, and all pictures therebetween. Structure information is thus generated for a stream linking in a list structure in the coding order at least one second of pictures in the range from the first I-picture temporally preceding the range containing the target pictures, to the first I-picture temporally following the same range.

It should be noted that one second is specified here because the MPEG standard requires that all pictures be cleared from the buffer within one second or less. Furthermore, imposing this limitation solves problem 1 of the prior art described above as one of the problems to be solved by the present invention.

More specifically, the present invention processes only the smallest necessary amount of data (equivalent to at most a one second period of pictures). The amount of data processed and the processing load are therefore reduced, and fast, easy video editing is made possible.

Furthermore, stream structure data is generated for each scene only once at the beginning of the scene and once at the end of the scene. If there are two scenes, for example, four stream structure data are generated.

Re-encoding Target Picture Type Determining Means 104

In step 4, the re-encoding target picture type determining means 104 determines the picture type (I-picture, P-picture, B-picture) of the target picture after it is re-encoded. The picture type after re-encoding is determined as follows in the present embodiment.

If the target picture is the first extracted picture, it is an I-picture. A picture temporally preceding the target picture is a P-picture. The target pictures are then re-encoded in step 13 to produce the picture types determined in step 4.

It should be noted that while this preferred embodiment of the invention uses either I-pictures or P-pictures as the picture type after re-encoding, B-pictures can also be obviously used. It is also possible to use only I-pictures. It is, however, preferable to select the picture types resulting in the smallest possible code so as to prevent great change in the stream.

Whether the edit stream is VBR coded is then detected (step 5). This is accomplished using the vbv_delay value in the header added to each picture. If vbv_delay is 0xFFFF, the stream is VBR coded; otherwise the stream is CBR coded. If the stream is VBR coded, control goes to step 6; otherwise the procedure skips to step 7.

Buffer Fullness Analyzing Means 105

In step 6, buffer fullness analyzing means 105 analyzes the change in buffer fullness. This step is only performed when the edit stream is VBR coded. In this case it is not possible to calculate the amount of code to allocate to the re-encoding range using the equation (equation 6) for calculating the re-encoding range code allocation. This is because vbv_delay is used to calculate the VBV_tail (buffer fullness immediately before the next picture after (in the coding order) the last picture in the recycled picture range of the scene) and VBV_head (buffer fullness immediately before the first picture in the recycled picture range of the scene) values used in equation 6, and vbv_delay is always 0xFFFF in VBR coded data.

Because buffer overflow states will not occur with a VBR coded stream, VBV_tail and VBV_head are set only in order to ensure that a buffer underflow state will not occur. More specifically, using the stream structure data for the end of the scene before the edit point (the point at which the two scenes are joined), and the stream structure data for the beginning of the scene after the edit point, buffer fullness analyzing means 105 analyzes for the pictures registered in the stream structure data the amount of data input to the buffer and the amount of data read from the buffer at the decode timing, and then calculates VBV_tail and VBV_head using the following equations 1 and 2 to ensure that a buffer underflow does not occur.

$$VBV\_tail = VBV(Ne) \qquad \text{Equation 1}$$

$$VBV(n) = \min\left\{VBV(n-1) + \frac{R}{F}, VBV\_SIZE\right\} - Psize(n)$$

where n is the picture sequence in the stream structure data (n=1, ... Ne).

n=1: first picture in the stream structure data
   n=Ne: last picture in the stream structure data
   R is a bit rate.
   F is a frame rate.
   VBV_SIZE is a VBV buffer size.
   Psize(n) is a code size of picture n.
   VBV(O)=0.

$$VBV\_head = VBV(Ns-1) \qquad \text{Equation 2}$$

$$VBV(n) = \min\left\{VBV(n-1) + \frac{R}{F}, VBV\_SIZE\right\} - Psize(n)$$

where n is the picture sequence in the stream structure data (n=1, ... Ns).

n=1: first picture in the stream structure data
   n=Ns: first picture in the recycled picture range
   R is a bit rate.
   F is a frame rate.
   VBV_SIZE is a VBV buffer size.
   Psize(n) is a code size of picture n.
   VBV(0) VBV_SIZE.

When the edit stream is MPEG-1 encoded, the bit rate is not encoded, and the bit rate used in equations (1) and (2) is therefore calculated using the stream structure data as above. In the case of VBR coded MPEG-1 data, 0x3FFFF is encoded in the sequence header where the bit rate is normally encoded. In MPEG-2 data, the maximum bit rate is encoded.

Buffer Fullness Calculating Means 106

In step 7 the buffer fullness calculating means 106 calculates the buffer fullness at the boundary between target pictures and recycled pictures not needing re-encoding when the edit stream is CBR coded. This boundary occurs in each scene at the first picture in the recycled picture range and the next picture after the last picture in the recycled picture range.

If VBV_head is buffer fullness at the first picture in the recycled picture range of each scene, and VBV_tail is buffer fullness at the next picture after the last picture in the recycled picture range of each scene, then VBV_head and VBV_tail can be calculated from the following equations (3) and (4).

$$VBV\_tail = R \times \frac{VBV\_delay\_tail}{90000} \qquad \text{Equation 3}$$

where R is a bit rate.

VBV_delay_tail is vbv_delay of next picture after the last picture in the recycled picture range at the end of the scene before the edit point.

$$VBV\_head = R \times \frac{VBV\_delay\_head}{90000} \qquad \text{Equation 4}$$

where R is a bit rate.

VBV_delay_tail is vbv_delay of the first picture in the recycled picture range at the beginning of the scene after the edit point.

However, if the edit stream is MPEG-2 coded, the bit rate used in equations (3) and (4) is calculated using the following equation (5).

$$R(n) = \frac{dn}{\tau(n) - \tau(n+1) + t(n+1) - t(n)} \qquad \text{Equation 5}$$

where R(n) is input rate of the n-th picture data.

dn is a code size from after the n-th picture_start_code to the (n+1) picture_start_code.

τ(n) is vbv_delay of the n-th picture. τ(n)=vbv_delay/ 90000.

t(n) is time at which the n-th picture is removed from vbv_buffer.

Re-encoding Range Code Allocation Calculator 107

In step 8, re-encoding range code allocation calculator 107 calculates the amount of code T to allocate to the re-encoding range (re-encoding range code allocation T). This re-encoding range code allocation T is calculated by applying buffer fullness VBV_head and VBV_tail calculated in steps 6 and 7 to equation (6).

$$T = \text{VBV\_tail} - \text{VBV\_head} + R \times \frac{N}{F} \qquad \text{Equation 6}$$

where VBV_tail is buffer fullness immediately before the time that the next picture after (in the coding order) the last picture in the recycled picture range at the end of the scene before the edit point, is decoded.

$$\text{VBV\_tail} = R \times \frac{\text{VBV\_delay\_tail}}{90000}$$

VBV_delay_tail is vbv_delay of the next picture after the end of the recycled picture range before the edit point (at the end of the scene).

VBV_head is buffer fullness immediately before the time that the first picture in the recycled picture range at the beginning of the scene after the edit point, is decoded.

$$\text{VBV\_tail} = R \times \frac{\text{VBV\_delay\_head}}{90000}$$

VBV_delay_head is vbv_delay of first picture in the recycled picture range after the edit point (at the beginning of the scene).

R is a bit rate.

N is a number of re-encoding target pictures at the edit point.

F is a frame rate.

How equation (6) is derived is described more fully below with reference to FIG. 6. FIG. 6 shows the change in buffer fullness when scene 1 and scene 2 are edited together.

As shown in FIG. 6(a), if the last extracted picture is picture B6 in scene 1, the target pictures are pictures B5 and B6 and the recycled picture range from picture B3 and before. If the first extracted picture in scene 2 is B25 as shown in FIG. 6(b), the target pictures are P24, B25, and B26, and the recycled picture range is from picture P27 and after. When scenes 1 and 2 and joined, target pictures B5, B6, B25, B26, and P24 are re-encoded to P5', P6', I25', P26', and P24'.

To prevent buffer underflow and buffer overflow, it is only necessary to ensure (a) that buffer fullness VBV_tail at the decoding time of the last picture in the recycled picture range B3 (that is, immediately before picture P4 (in the coding order) after picture B3 is decoded) is the same before and after the scenes are joined, and (b) that buffer fullness VBV-head at decoding time of the first picture in the recycled picture range P27 is also the same before and after the scenes are joined. Accomplishing this by allocating the five re-encoded pictures (P5', P6', I25', P26', P24') to the range in which the target pictures are allocated (picture B3 decoding time to picture P27 decoding time) is considered next.

From FIG. 6 we know that the code T allocated to this range is equal to the sum of the difference of the code size at the decoding time of the next picture after picture B3 and the code size at the decoding time of picture P27 (VBV_tail—VBV_head) to the code input during the time of the five re-encoded pictures (R×N/F).

However, when code size is actually allocated to the target pictures, code is allocated in the case of CBR data so that the buffer neither overflows nor underflows, but in the case of VBR data data is allocated only to prevent buffer underflow. Buffer matching is thus assured.

Re-encoding range code allocation T is thus obtained by calculating VBV_tail and VBV_head and applying these values to equation (6). Note that if there is no scene before the edit point, VBV_tail=VBV buffer size; if there is no scene after the edit point, VBV_head=0.

Code Allocation Verifying Means 108

In step 9 the code allocation verifying means 108 verifies whether code allocation T is appropriate based on the picture type of the target pictures after re-encoding and the. If code allocation T is appropriate, the procedure skips to step 11; otherwise control goes to step 10.

In step 9, the average code size of the pictures listed in the stream structure data generated in step 3 is calculated for each picture type. Di, Dp, and Db are, respectively, the calculated average code size of the I-pictures, P-pictures, and B-pictures.

Next, the initial total code allocation for the re-encoding range is calculated from the number of target pictures in the re-encoding range and the picture types after re-encoding. This initial code total T0 can be calculated from the following equation where Ni is the number of I-pictures, Np is the number of P-pictures, and Nb is the number of B-pictures, after re-encoding.

Equation 7

$$T0 = Di \times Ni + Dp \times Np + Db \times Nb$$

At the end of step 9, code allocation verifying means 108 verifies whether the calculated initial code total T0 is appropriate. This initial code total T0 is appropriate if code allocation T calculated in step 8 is greater than the initial code total T0 multiplied by the maximum compression ratio; otherwise it is inappropriate.

This maximum compression ratio is determined by evaluating whether the picture deterioration after re-encoding is acceptable, and is a value from 0 to 1. From experience, we have found a maximum compression ratio of 0.6 preferable.

The code allocation verifying means 108 determines the code size to be inappropriate in step 9 even when there is no target picture at the edit point. This is because buffer control is accomplished in this exemplary embodiment by adjusting the code size of the re-encoded pictures. If there is no target picture, buffer control is difficult.

Re-encoding Range Expanding Means 109

If the code allocation T is determined not appropriate in step 9, re-encoding range expanding means 109 extends the re-encoding range in step 10, and the procedure then loops back to step 4.

Extending the re-encoding range means increasing the number of target pictures for re-encoding. If in step 10 there is no re-encoding target picture at the edit point, a target picture is selected so that there is at least one re-encoded picture. Code allocation T for the target picture in the code allocation equation (6) depends on VBV_tail—VBV_head. The re-encoding range is therefore expanded to increase VBV_tail—VBV_head.

More specifically, re-encoding range expanding means 109 searches in the direction that will extend the re-encoding range, and re-encodes the first intra-coded picture (a I-picture) in the recycled picture range to a forward predictive-coded picture (a P-picture). The re-encoding range expanding means 109 is described in further detail with reference to FIG. 4, FIG. 5, FIG. 7, and FIG. 8.

Figure 7A:
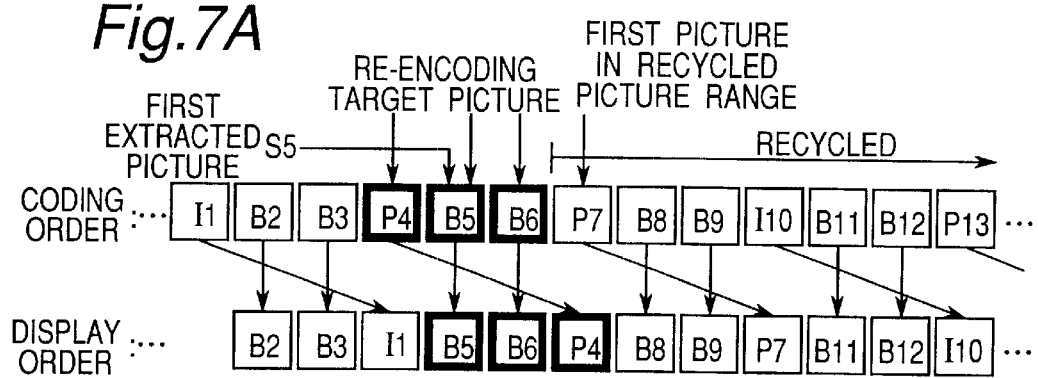
FIG. 7(a) shows pictures at the beginning of a scene before editing; (b) shows pictures at the beginning of a scene after editing; (c) shows pictures before editing after range extension at the beginning of a scene; (d) shows pictures after editing after range extension at the beginning of a scene.
Figure 7B:
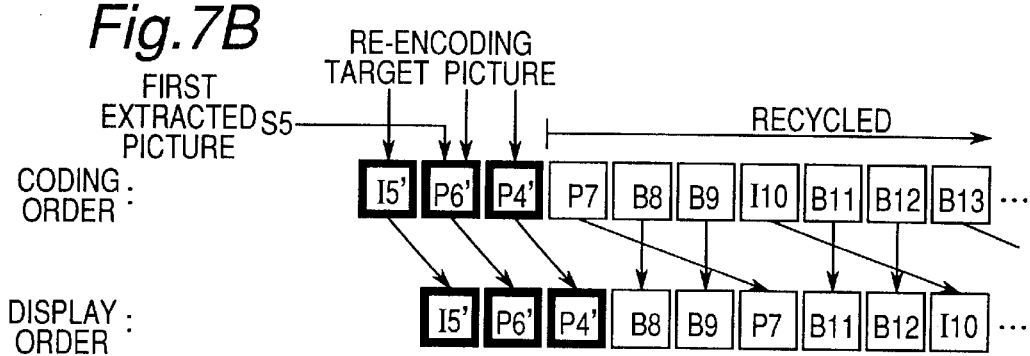
Figure 7C:
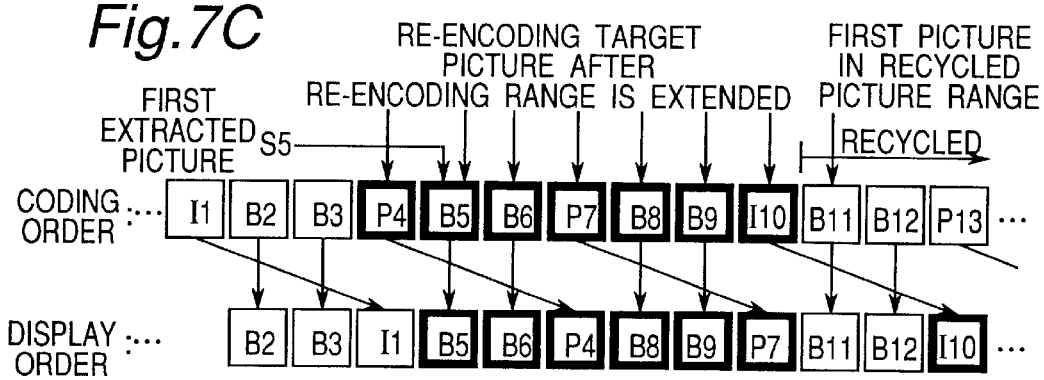
Figure 7D:
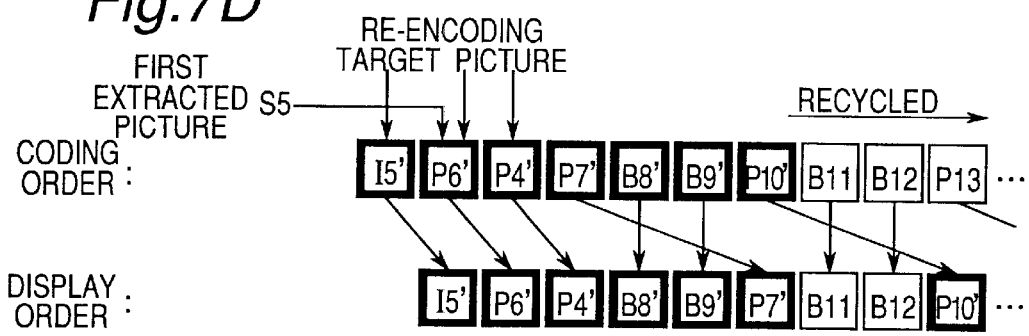

Operation when processing the beginning of the scene is described first. FIG. 7 illustrates the process for extending the re-encoding range when the first extracted picture is S5 in FIG. 4. FIG. 7(a) shows the re-encoding target pictures after step 2. FIG. 7(b) shows the result of re-encoding with the target pictures selected in FIG. 7(a). FIG. 7(c) shows the re-encoding target pictures after step 10. FIG. 7(d) shows the result of re-encoding with the target pictures selected in FIG. 7(c).

As shown in FIG. 7(a), the target pictures are P4, B5, and B6, and the first picture in the recycled picture range is P7.

After editing pictures P4, B5, and B6 are re-encoded to P4', I5', and P6' as shown in FIG. 7(b). Furthermore, the original picture data is used for pictures P7 and after in the coding order. The order of the pictures in the coding order is I5', P6', P4', and P7 and after.

Note that the number of target pictures is increased in this case as shown in FIG. 7(c). Using the stream structure data, the first I-picture (that is, picture I10) found searching forward from the first picture in the recycled picture range (referring to FIG. 7(a), i.e., picture P7) is designated the last target picture in the re-encoding range. This means that the target picture range is extended from pictures P4, B5, and B6 to include pictures P4, B5, B6, P7, B8, B9, and I10.

After editing, pictures P4, B5, B6, P7, B8, B9, and I10 are re-encoded as pictures P4', I5', P6', P7', B8', B9', and P10'. The first picture in the recycled picture range is also updated to picture B11. During re-encoding, the last I-picture in the range of re-encoding target pictures is changed to a P-picture, thereby reducing the code size of the picture.

By thus extending the re-encoding range and re-encoding I-picture I10 to a P-picture P10', VBV_head can be reduced. VBV_tail—VBV_head is thus increased, and the code allocation for each picture is thereby increased.

Figure 8:
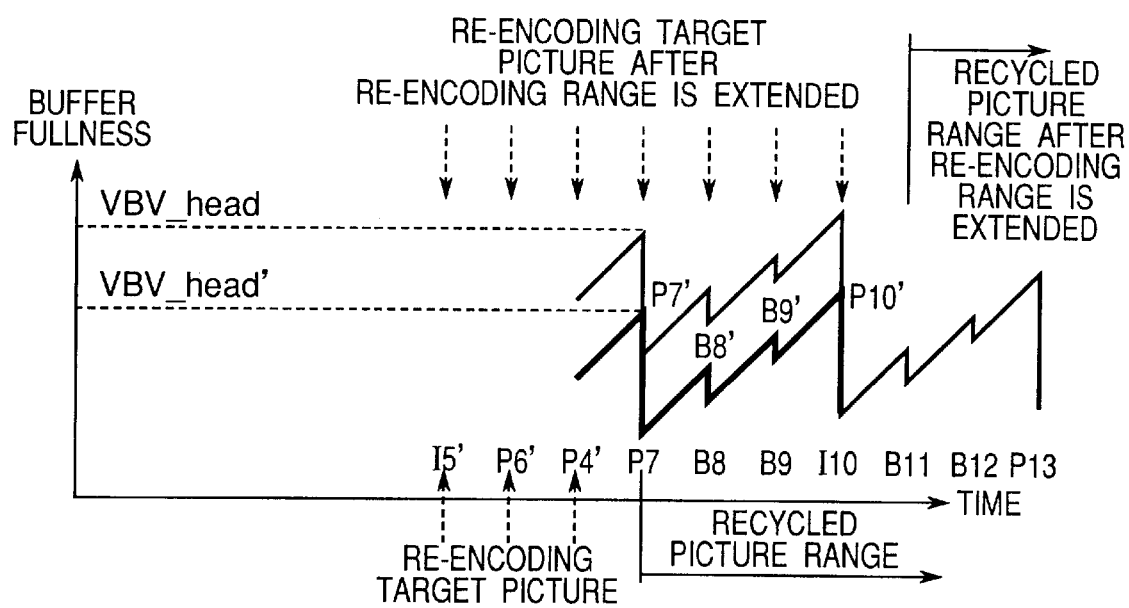
FIG. 8 is a graph showing the change in buffer fullness before and after the re-encoding range extension process at the beginning of a scene.

FIG. 8 shows the change in buffer fullness before and after this process. The code size allocated to pictures I5', P6', and P4' is considered in FIG. 8. If VBV_head is the code size immediately before decoding picture P7 before extending the re-encoding range, VBV_head' is the code size at the corresponding time after extending the range. Note that VBV_head' is less than VBV_head.

The code allocation for pictures I5', P6' and P4' is greater after this range extending process. This is because an I-picture, which consumes a large amount of code, is re-encoded as a P-picture, which uses less code compared with an I-picture.

Figure 9A:
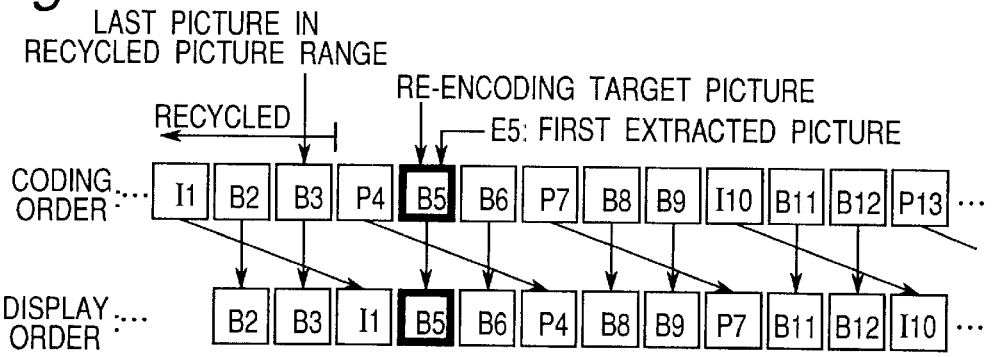
FIG. 9(a) shows pictures at the end of a scene before editing; (b) shows pictures at the end of a scene after editing; (c) shows pictures before editing after range extension at the end of a scene; (d) shows pictures after editing after range extension at the end of a scene.
Figure 9B:
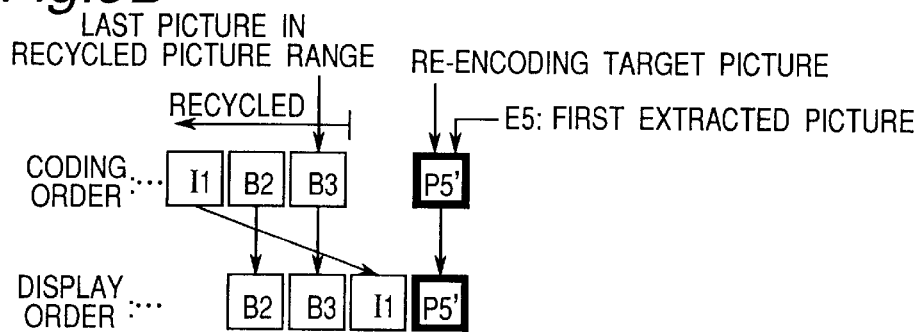

The process extending the re-encoding range at the end of the scene is described next. FIG. 9 illustrates the process for extending the re-encoding range when the last extracted picture is E5 in FIG. 5. FIG. 9(a) shows the re-encoding target pictures after step 2. FIG. 9(b) shows the result of re-encoding with the target pictures selected in FIG. 9(a). FIG. 9 (c) shows the re-encoding target pictures after step 10. FIG. 9(d) shows the result of re-encoding with the target pictures selected in FIG. 9(c).

As shown in FIG. 9(a), the target picture in this case is B5, and the last picture in the recycled picture range is B3.

After editing, picture B5 is re-encoded to P5' as shown in FIG. 9(b). Furthermore, the original picture data is used for pictures B3 and before in the coding order. The order of the pictures in the coding order is up through B3, and then P5'.

Figure 9C:
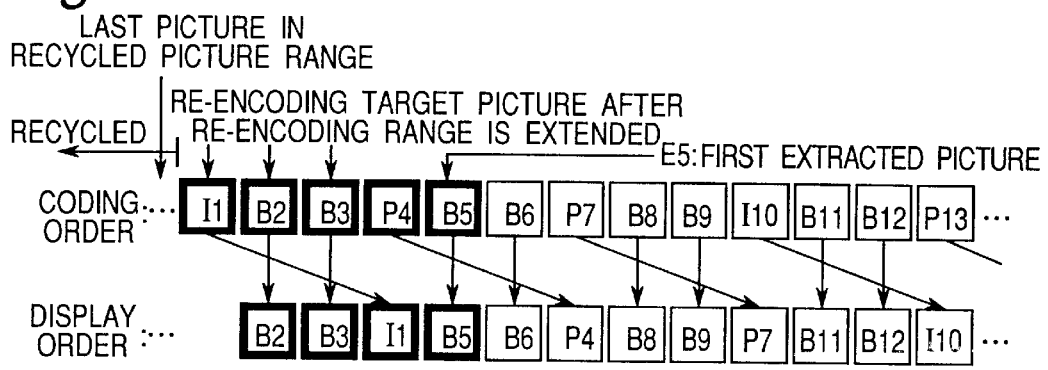
Figure 9D:
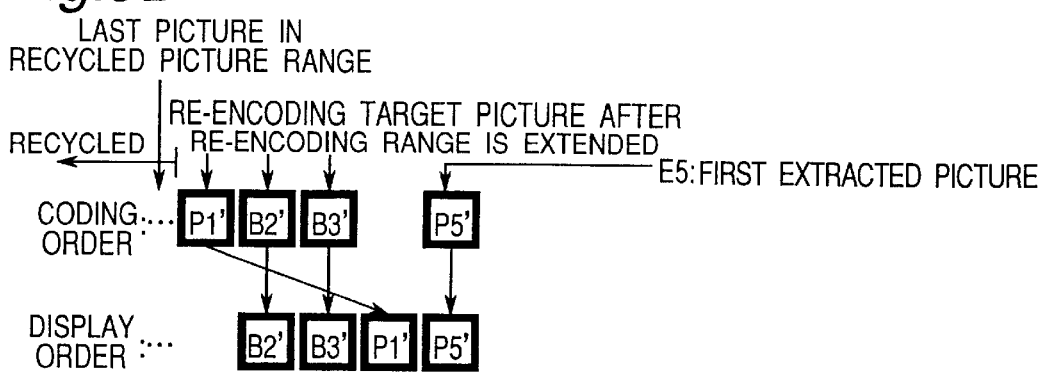

Note that the number of target pictures is increased in this case as shown in FIG. 9(c). The first target picture in the re-encoding range is reset to the first I-picture (that is, picture I1) found searching backward from the last picture in the recycled picture range (referring to FIG. 9(a), i.e., picture B3) using the stream structure data. This means that the target picture range is extended from picture B5 to pictures I1, B2, B3, and B5. In this case, P-picture P4 is reproduced outside the extracted scene range, and is thus deleted.

After editing, pictures I1, B2, B3, and B5 are re-encoded to pictures P1', B2', B3', and P5'. The last picture in the recycled picture range is also updated to the picture immediately before picture I1. By thus re-encoding the first I-picture in the re-encoding range to a P-picture, the code size of that picture is reduced.

By thus extending the re-encoding range and re-encoding I-picture I1 to a P-picture P1', VBV_tail can be increased. VBV_tail—VBV_head is thus increased, and the code allocation for each picture is thereby increased.

Figure 10:
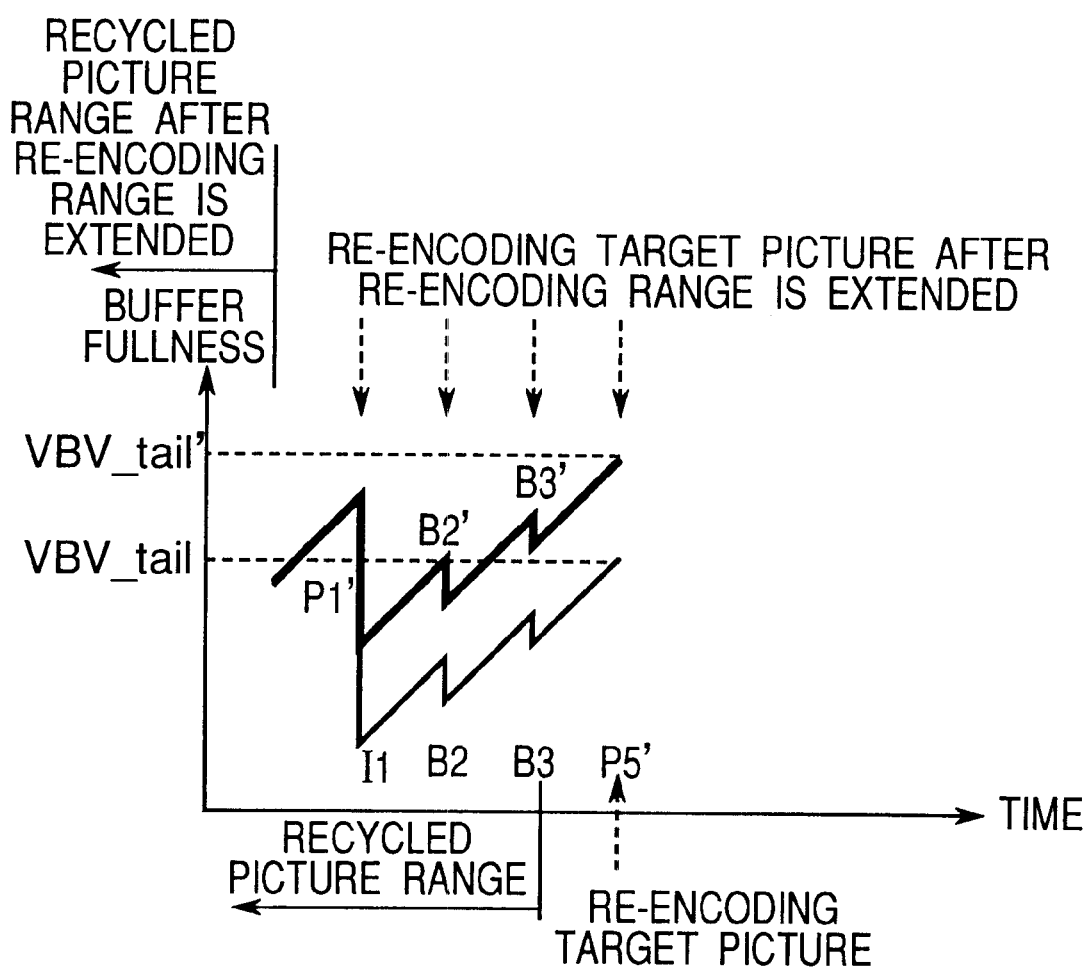
FIG. 10 is a graph showing the change in buffer fullness before and after the re-encoding range extension process at the end of a scene.

FIG. 10 shows the change in buffer fullness before and after this process. The code size allocated to pictures P5' is considered in FIG. 10. If VBV_tail is the code size immediately before decoding the next picture after picture B3 before extending the re-encoding range, VBV_tail' is the code size at the corresponding time after extending the range. Note that VBV_tail' is greater than VBV_tail.

The code allocation for picture P5' is greater after this range extending process. This is because an I-picture, which consumes a large amount of code, is re-encoded as a P-picture, which uses less code compared with an I-picture.

It should be noted that VBV_tail—VBV_head can be increased by only increasing VBV_tail or only decreasing VBV_head, and that this is sufficient for some cases, but it is preferable to both increase VBV_tail and decrease VBV_head.

Re-encoding Target Picture Importance Calculating Means 110

In step 11, re-encoding target picture importance calculating means 110 determines the importance of each target picture in the re-encoding range. This process is described more fully below with reference to FIG. 11 FIG. 11 shows the process for calculating target picture importance for scene 1 and scene 2 extracted from edit stream sources 1 and 2, respectively, and then combined to a new video stream.

Figure 11:
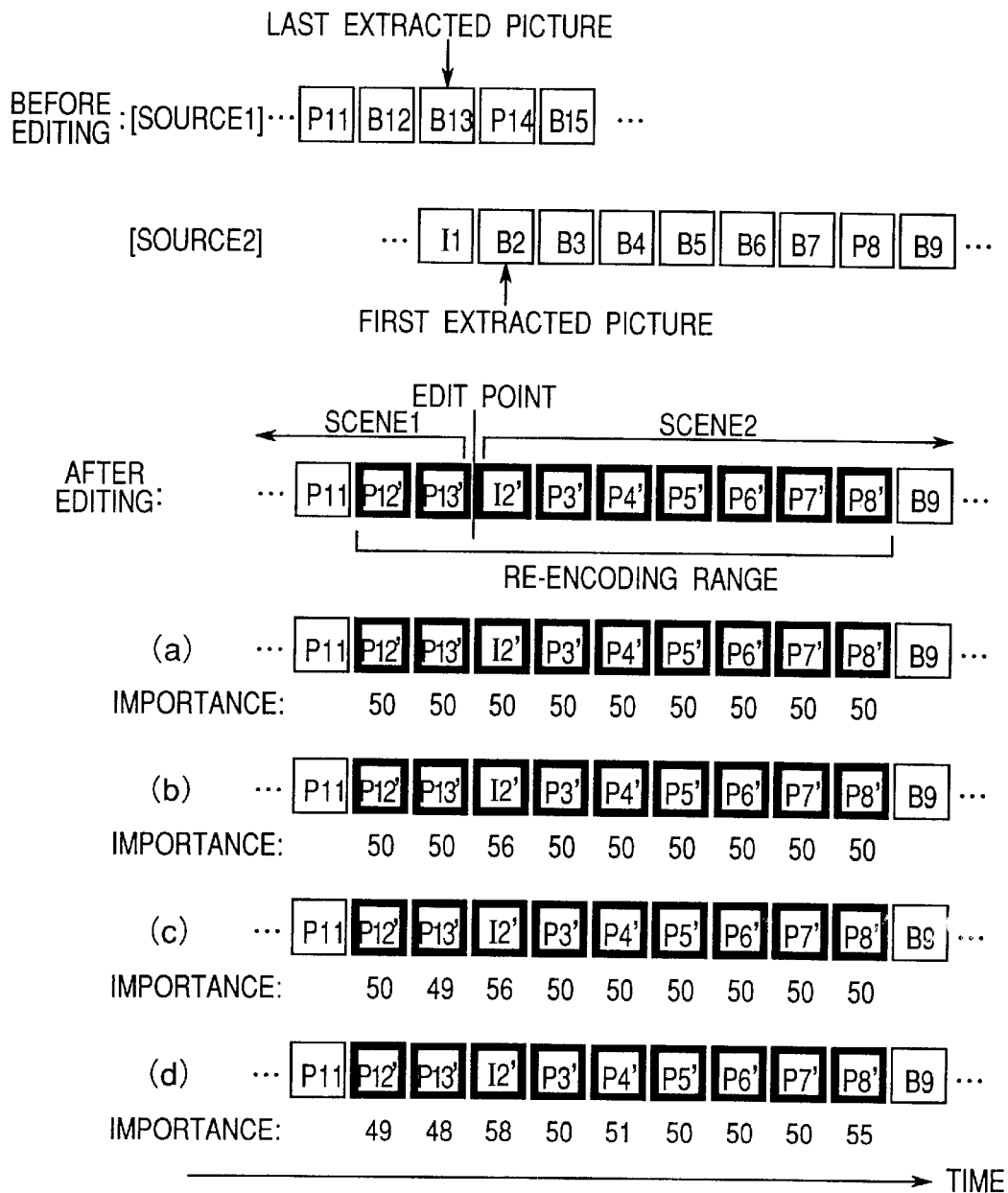
FIG. 11 illustrates calculating the importance rating of each target picture.

Pictures are shown in the display order in FIG. 11. Step 2 identifies pictures B12 and B13 in scene 1, and pictures B2 to P7 in scene 2, as the target pictures at the edit point between scenes 1 and 2. Step 4 then specifies the picture type after re-encoding as indicated from picture P12' to P8'. This consecutive sequence of target pictures is the re-encoding range.

The importance rating of each target picture in the re-encoding range is initially set uniformly to the same value. In this exemplary embodiment of the invention the picture importance rating is initially set at 50 as shown in FIG. 11(a).

The importance rating of each target picture is then increased or decreased based on the result of a verification process determining target picture importance. This verification process is described below.

The re-encoding ranges are considered separately in each scene. At the beginning of a scene, a constant B multiplied by the number of target pictures in the re-encoding range starting with the second target picture is added to the importance rating of the first target picture, that is, the number of pictures in the re-encoding range minus 1. This is shown in FIG. 11(b). The beginning of scene 2 is I-picture I2'. Six target pictures follow picture I2'. Constant B in this exemplary embodiment is 1. Therefore (6×1) is added to the initial importance rating of picture 12', which is 50 now, and the importance of picture 12' is thus reset to 56. The importance of the first picture in a scene is thus increased.

This technique is used because the second and subsequent target pictures are P-pictures or B-pictures at the beginning of a scene, and are encoded by referring to the first target picture, which is an I-picture. Therefore, if the quality of the first target picture is poor, the quality of target pictures following thereafter will be degraded, and a drop in picture quality will be propagated. In other words, the more target pictures there are following the first target picture, the more important the first target picture becomes.

At the end of a scene, on the other hand, the importance rating of the last target pictures is decreased a constant C. This is shown in FIG. 11(c). Note that constant C is also 1 in this preferred embodiment of the invention. The end of scene 1 is picture P13'. Its importance rating of 50 (the initial value) is therefore reduced 1 to obtain the new importance rating of 49 for picture P13'. The importance of pictures at the end of a scene is thus reduced.

This is because the edit point is the point at which the scenes change, and pictures in proximity to the scene change are difficult for the viewer to perceive.

Target picture importance is also adjusted up or down by comparing the code size of the target pictures before editing with the average code size of each picture based on the picture type of the target pictures before editing and the picture type after re-encoding.

The importance adjustment dG used here is calculated as shown in the following equation in this preferred embodiment of the invention.

$$dG = \frac{Dorg - Dave}{Dave} \Big/ D \qquad \text{Equation 8}$$

where Dorg is an original code size of the re-encoding target picture.

Dave is an average code size for each picture type (matching the picture type of Dorg). D is a constant value.

In equation (8), Dave uses the average code size value calculated for each picture type in step 9 that matches Dorg. Constant D in equation (8) is also 100 in this embodiment. The decimal part of the result of equation (8) is rounded to obtain importance adjustment dG. This is shown in FIG. 11(d). The importance rating of each target picture is thus determined.

If original code size Dorg of the original picture B12 is 1% smaller than average code size Dave for B type pictures, the importance of the corresponding re-encoded picture P12' after re-encoding picture B12 is reduced by subtracting 1 from 50, obtaining an importance rating of 49.

Furthermore, if original code size Dorg of the original picture B13 is 1% smaller than average code size Dave for B type pictures, the importance of the corresponding re-encoded picture P13' after re-encoding picture B12 is reduced by subtracting 1 from 49, obtaining an importance rating of 48.

Furthermore, if original code size Dorg of the original picture B2 is 2% greater than average code size Dave for B type pictures, the importance of the corresponding re-encoded picture 12' after re-encoding picture B2 is increased by adding 2 to 56, obtaining an importance rating of 58.

Furthermore, if original code size Dorg of the original picture B4 is 1% greater than average code size Dave for B type pictures, the importance of the corresponding re-encoded picture P4' after re-encoding picture B4 is increased by adding 1 to 50, obtaining an importance rating of 51.

If original code size Dorg of the original picture P8 is 5% greater than average code size Dave for P-type pictures, the importance of the corresponding re-encoded picture P8' after re-encoding picture P8 is increased by adding 5 to 50, obtaining an importance rating of 55.

It will thus be known that if the code size of the original picture is greater than the average code size for the same picture type, the importance rating is increased according to the magnitude of the difference. Likewise if the code size is smaller than the average code size for the same picture type, the importance rating is decreased according to the magnitude of the difference.

Re-encoding Target Picture Target Code Size Calculating Means 111

In step 12, the re-encoding target picture target code size calculating means 111 calculates the code allocation (target code size) for each target picture based on the importance of each target picture, the re-encoding range code allocation, the number of target pictures, and the picture type after re-encoding.

The process whereby this step is accomplished is described in further detail below.

The first step is to define the average code size calculated in step 8 as the initial value for the target code size.

Next, this target code size is adjusted based on the importance rating derived in step 11. This operation is further described below.

First, the average importance of the target pictures contained in the re-encoding range is obtained. Next, (target picture importance rating)/(average importance) is multiplied by the target code size for each picture to increase or decrease the target code size. Let us assume that the total target code size of each target picture at this point is T1.

Next, the difference between the re-encoding range code allocation and the target code size is distributed to each of the target pictures according to the ratio of the average code size of the pictures. Finally, it is verified that buffer underflow and buffer overflow will not occur at the target picture decoding timing; if either a buffer underflow or overflow will occur, the target code size of each target picture is adjusted again. This operation is further described below.

First, the difference Tdiff between re-encoding range code allocation T and total target code size T1 calculated in the previous process is calculated using the following equation.
Equation 9

$$Tdiff = T - T1$$

Code distribution Di_add, Dp_add, and Db_add distributed to the target pictures according to picture type is calculated using the following equations (10) according to the picture type after re-encoding the target pictures.

$$Di\_add = \frac{Tdiff}{Ni + Np \times \frac{Dp}{Di} + Nb \times \frac{Db}{Di}} \qquad \text{Equation 10}$$

$$Dp\_add = Di\_add \times \frac{Dp}{Di}$$

$$Db\_add = Di\_add \times \frac{Db}{Di}$$

where Ni is a number of re-encoding target pictures in the re-encoding range that are I-pictures after re-encoding.

Np is a number of re-encoding target pictures in the re-encoding range that are P-pictures after re-encoding.

Nb is a number of re-encoding target pictures in the re-encoding range that are B-pictures after re-encoding.

Di is an average code size of I-pictures.

Dp is an average code size of P-pictures.

Db is an average code size of B-pictures. Note that Di, Dp, and Db in equation (10) are the average code size values calculated for each picture type in step 9. Target code size values Di_targ, Dp_targ, and Db_targ are then calculated using equation (11) for picture types I, P, and B, respectively, after re-encoding.

Equation 11

$$Di\_targ = Di + Di\_add$$

$$Dp\_targ = Dp + Dp\_add$$

$$Db\_targ = Db + Db\_add$$

Finally, whether a buffer overflow or buffer underflow will occur at the target picture decode timing is verified, and if either will, the target code size of each target picture is again adjusted. This verification is performed using equation (12) below from the first target picture in the re-encoding range near the edit point in sequence to the last target picture.

Equation 12

$$VBV\_reen(n) + \frac{R}{F} \leq VBV\_SIZE \quad (a)$$

$$VBV\_reen(n) \geq 0 \quad (b)$$

where if CBR coded:

$$VBV\_reen(n) = VBV\_reen(n-1) + \frac{R}{F} - Psize(n)$$

and if VBR coded:

$$VBV\_reen(n) = \min\left\{VBV\_reen(n-1) + \frac{R}{F}, VBV\_SIZE\right\} - Psize(n)$$

$$VBV\_reen(0) = VBV\_tail - \frac{R}{F} - Psize(1)$$

where VBV_tail is a buffer fullness of the next picture after the last picture in the recycled picture range at the end of the scene before the edit point.

n is the picture sequence of target pictures in the re-encoding range where (n=1, . . . Nr).

n=1: first target picture n=Nr: last target picture

R is a bit rate.

F: frame rate

VBV_SIZE is a VBV buffer size.

Psize(n) is a target code size of picture n.

Note that equation 12 (a) defines the condition for a buffer overflow not occurring, and (b) the condition for a buffer underflow not occurring. If equation 12 (a) is false, buffer overflow will occur at the decode timing of the target picture being verified. In this case, the target code size of the target picture is recalculated using equation 13 (a), and the difference before and after the recalculation is distributed to the target pictures following thereafter according to the ratio of the average code size of each picture type obtained in step 9.

If equation 12 (b) is false, buffer underflow will occur at the decode timing of the target picture being verified. In this case, the target code size of the target picture is recalculated using equation 13 (b), and the difference before and after the recalculation is distributed to the target pictures following thereafter according to the ratio of the average code size of each picture type obtained in step 9.

Equation 13

$$Psize(n) = VBV(n-1) + \frac{2 \times R}{F} - VBV\_SIZE \quad (a)$$

$$Psize(n) = VBV(n-1) + \frac{R}{F} \quad (b)$$

The total code size of the re-encoded pictures thus becomes equal to the target total code size. The target code size for each target picture is thus determined.

Picture Re-encoding Means 112

In step 13, the picture re-encoding means 112 re-encodes the target pictures based on the calculated target picture code size and the picture type after re-encoding. The I-picture referenced for coding the first target picture is first found in the stream structure data, and is decoded.

The re-encoder continues searching forward in the stream to decode the I-pictures, P-pictures, and target pictures for re-encoding. Future and past referenced pictures, that is, pictures used for predictive coding P-pictures or B-pictures, are buffered to temporary storage at this time.

For example, a P-picture is decoded using the first I-picture or P-picture encountered in the stream as a "future referenced picture." When a re-encoding target picture is found, the picture is decoded and then re-encoded to match the target code size.

If the target picture cannot be coded to match the target code size, the code size is adjusting by adding invalid data such as stuffing or padding bytes, or the difference between the target code size and the coded size of the target picture is added to the target code size of the next target picture. If the picture type after re-encoding is a P-picture, the picture is buffered to memory for use as a future referenced picture. Processing ends when all target pictures have been re-encoded.

Scene Linking Means 113

In step 14, the scene linking means 113 links the scenes to produce a new bitstream. The scene linking means 113 links the scenes in the specified sequence based on the scene information input in step 1, and generates a new stream of the output file name specified in the scene information. This operation is described more fully below with reference to FIG. 12.

If three scenes are to be linked in the sequence scene 1, scene 2, and scene 3, the target pictures in each of the scenes are re-encoded by the process through step 13 so that each scene can be independently reproduced, and the scenes are extracted from the original bitstream. The scenes at this point are shown in FIG. 12(*a*). In step 14, the scenes thus prepared are connected in the specified sequence as shown in FIG. 12(*b*). This is accomplished as described below.

First, the re-encoded target pictures at the beginning of scene 1 are connected in coding order. If the picture type of the target picture before editing is different from the picture type after re-encoding, the pictures are rearranged based on the display order in a coding order conforming to the picture type after target picture re-encoding.

Next, the re-encoded target pictures at the beginning of the scene are connected to the recycled picture range of scene 1. The re-encoded target pictures at the end of scene 1 are then connected in coding order.

This same operation is performed on scene 2 and scene 3. The new stream generated by connecting the scenes is then output to a file of the specified output file name. It will be obvious that while this step first connects the scenes and then outputs the completed scene sequence to a file, it is alternatively possible to sequentially output the bitstream to the output file while connecting the scenes.

The editing process of the present invention described above thus extracts a plurality of consecutive frames (scenes) from a bitstream for editing, and produces a new stream of plural linked scenes.

It will be obvious to one with ordinary skill in the related art that a plurality of scenes can be selected from a single bitstream, scenes can contain overlapping frame sequences, and the scenes can be selected from a plurality of different bitstreams.

Furthermore, the editing process of the encoded stream is accomplished by means of a software program in the above described exemplary embodiment of the invention, but it will be obvious to one with ordinary skill in the related art that part or all of this process can also be achieved using logic circuits or other hardware components. Thus comprising the invention makes it possible to shorten the processing time.

It will also be obvious that the equations and numeric values in the preceding explanation are used by way of illustration only, and can be replaced with other equations and values insofar as the object of the present invention is achieved without departing from the scope of the accompanying claims.

Furthermore, the present invention also includes a data storage medium to which the steps or a data stream expressing the steps shown in FIG. 3 are recorded.

The invention as described above extracts a plurality of consecutive frames (scene) from an existing MPEG stream, reconnects a plurality of scenes, and produces a new stream that will not cause a buffer underflow or buffer overflow.

In addition, when producing this stream, buffer control processing is limited to the least required processing and is not dependent on the scene length. Data processing and the processing load are therefore not great, and it is not necessary to insert compensating P-pictures. The frame count before and after editing are thus the same, and editing can be easily accomplished.

The re-encoding target picture type determining means of the present invention extensively uses picture types with a code size smaller than I-pictures, allocates efficiently, and suppresses picture quality deterioration.

The code allocation verifying means and re-encoding range expanding means of the present invention extend the range of re-encoded frames when necessary, verify that the allocated code is always within an appropriate range, and thus maintain the overall quality of the video.

By re-encoding from an I-picture to a P-picture, the re-encoding range expanding means of the invention increases the code allocation to other pictures, and thus achieves even better picture quality.

The re-encoding target picture importance calculating means assures that more code is allocated to pictures with a high importance rating, less is allocated to pictures of lesser importance, and thus assures efficient code allocation. This further prevents propagating picture quality loss at the edit point, and thus maintains the overall quality of the video.

The buffer fullness analyzing means of the present invention verifies the change in buffer fullness at the edit point when editing a VBR stream, and thus prevents buffer underflow.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The present disclosure relates to subject matter contained in Japanese Patent Application Nos. HEI 11-312114, filed on Nov. 2, 1999, and 2000-307520, filed on Oct. 6, 2000, the contents of both being herein expressly incorporated by reference in their entireties.

What is claimed is:

1. A video editing apparatus comprising:
   a scene information input means for inputting scene information, where a scene is a plurality of consecutive frames extracted from an edit stream;
   a re-encoding target picture selector for selecting as target pictures for re-encoding the smallest number of pictures that must be re-encoded for the scene to be independently reproducible;
   a stream structure data generator for generating structure information for a stream in a range containing a target picture and an intra-coded picture referenced for coding the target picture;
   a buffer fullness calculating means for calculating, from stream structure data, buffer fullness at a target picture boundary to a recycled picture not requiring re-encoding;
   a re-encoding range code allocation calculator for calculating a code allocation to a re-encoding range based on buffer fullness and target picture count, said re-encoding range being one or a plurality of target pictures near an edit point between scenes;
   a re-encoding target picture target code size calculating means for calculating a code allocation to each target picture based on the re-encoding range code allocation, target picture count, and picture type after re-encoding; and
   a scene linking means for connecting scenes and producing a new stream.

2. A video editing apparatus as described in claim 1, further comprising:
   a re-encoding target picture type determining means for deciding, from the stream structure data, a target picture type after re-encoding; and
   a picture re-encoding means for target picture re-encoding based on target picture target code size and picture type after re-encoding.

3. A video editing apparatus as described in claim 2, further comprising:
   a code allocation verifying means for verifying whether the code allocation is appropriate based on the re-encoding range code allocation and target picture picture type after re-encoding; and
   a re-encoding range expanding means for extending the re-encoding range if the code allocation is not appropriate.

4. A video editing apparatus as described in claim 3, wherein the re-encoding range expanding means searches in a direction extending the re-encoding range, and re-encodes a first intra-coded picture found in the recycled picture range to a forwardly predictive-coded picture.

5. A video editing apparatus as described in claim 1, further comprising a re-encoding target picture importance calculating means for calculating an importance rating for each target picture in the re-encoding range.

6. A video editing apparatus as described in claim 1, further comprising a buffer fullness analyzing means for analyzing buffer fullness change when the edit stream is variable bit rate coded and calculating buffer fullness is difficult.

7. A video editing method, comprising:

a scene information input step for inputting scene information, where a scene is a plurality of consecutive frames extracted from an edit stream;

a re-encoding target picture step for selecting as target pictures for re-encoding the smallest number of pictures that must be re-encoded for the scene to be independently reproducible;

a stream structure data generating step for generating structure information for a stream in a range containing a target picture and an intra-coded picture referenced for coding the target picture;

a buffer fullness calculating step for calculating, from stream structure data, buffer fullness at a target picture boundary to a recycled picture not requiring re-encoding;

a re-encoding range code allocation calculating step for calculating a code allocation to a re-encoding range based on buffer fullness and target picture count, said re-encoding range being one or a plurality of target pictures near an edit point between scenes;

a re-encoding target picture target code size calculating step for calculating a code allocation to each target picture based on the re-encoding range code allocation, target picture count, and picture type after re-encoding; and a scene linking step for connecting scenes and producing a new stream.

8. A video editing method as described in claim 7, further comprising:

a re-encoding target picture type determining step for deciding, from stream structure data, a target picture picture type after re-encoding; and a picture re-encoding step for target picture re-encoding based on target picture target code size and picture type after re-encoding.

9. A video editing method as described in claim 8, further comprising:

a code allocation verifying step for verifying whether the code allocation is appropriate based on the re-encoding range code allocation and target picture picture type after re-encoding; and a re-encoding range expanding step for extending the re-encoding range if the code allocation is not appropriate.

10. A video editing method as described in claim 9, wherein the re-encoding range expanding step searches in a direction extending the re-encoding range, and re-encodes a first intra-coded picture found in the recycled picture range to a forwardly predictive-coded picture.

11. A video editing method as described in claim 7, further comprising a re-encoding target picture importance calculating step for calculating an importance rating for each target picture in the re-encoding range.

12. A video editing method as described in claim 7, further comprising a buffer fullness analyzing step for analyzing buffer fullness change when the edit stream is variable bit rate coded and calculating buffer fullness is difficult.

13. A data storage medium having a computer readable instructions recorded thereon, the computer readable instructions including instructions capable of instructing a computer to:

input scene information, where a scene is a plurality of consecutive frames extracted from an edit stream;

select, as target pictures for re-encoding, the smallest number of pictures that must be re-encoded for the scene to be independently reproducible;

generate structure information for a stream in a range containing a target picture and an intra-coded picture referenced for coding the target picture;

calculate, from stream structure data, buffer fullness at a target picture boundary to a recycled picture not requiring re-encoding;

calculate a code allocation to a re-encoding range based on buffer fullness and target picture count, said re-encoding range being one or a plurality of target pictures near an edit point between scenes;

calculate a code allocation to each target picture based on the re-encoding range code allocation, target picture count, and picture type after re-encoding; and connect scenes and produce a new stream.

14. A data storage medium as described in claim 13, wherein the computer readable instructions further include instructions operable to instruct the computer to:

decide, from stream structure data, a target picture picture type after re-encoding; and re-encode a target based on target picture target code size and picture type after re-encoding.

15. A data storage medium as described in claim 14, wherein the computer readable instructions further include instructions operable to instruct the computer to:

verify whether the code allocation is appropriate based on the re-encoding range code allocation and target picture type after re-encoding; and extend the re-encoding range if the code allocation is not appropriate.

16. A data storage medium as described in claim 15, wherein the computer readable instructions capable of instructing the computer to extend the re-encoding range comprise instructions operable to instruct the computer to search in a direction extending the re-encoding range, and re-encode a first intra-coded picture found in the recycled picture range to a forwardly predictive-coded picture.

17. A data storage medium as described in claim 13, further comprising computer readable instructions operable to instruct the computer to calculate step for calculating an importance rating for each target picture in the re-encoding range.

18. A data storage medium as described in claim 13, further comprising computer readable instructions operable to instruct the computer to analyze buffer fullness change when the edit stream is variable bit rate coded and calculating buffer fullness is difficult.

* * * * *

UNITED STATES PATENT AND TRADEMARK OFFICE
CERTIFICATE OF CORRECTION

PATENT NO. : 6,587,506 B1
DATED : July 1, 2003
INVENTOR(S) : Noridomi et al.

It is certified that error appears in the above-identified patent and that said Letters Patent is hereby corrected as shown below:

Title page,
Item [*] Notice, delete the phrase "by 434 days" and insert -- by 405 days --

Signed and Sealed this

Twenty-second Day of March, 2005

JON W. DUDAS
*Director of the United States Patent and Trademark Office*